United States Patent
Smith

(10) Patent No.: US 11,724,913 B2
(45) Date of Patent: *Aug. 15, 2023

(54) COMPACT PORTABLE LIFT ASSEMBLY

(71) Applicant: ADAPTIVE CONCEPTS LTD., Calgary (CA)

(72) Inventor: David W Smith, Calgary (CA)

(73) Assignee: ADAPTIVE CONCEPTS LTD., Calgary (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/489,514

(22) Filed: Sep. 29, 2021

(65) Prior Publication Data

US 2022/0073315 A1 Mar. 10, 2022

Related U.S. Application Data

(62) Division of application No. 15/754,977, filed as application No. PCT/CA2016/050998 on Aug. 24, 2016, now Pat. No. 11,167,954.

(Continued)

(51) Int. Cl.
*B66B 9/08* (2006.01)
*B66B 9/193* (2006.01)
(Continued)

(52) U.S. Cl.
CPC .............. *B66B 9/08* (2013.01); *B66B 9/083* (2013.01); *B66B 9/0815* (2013.01); *B66B 9/16* (2013.01);
(Continued)

(58) Field of Classification Search
CPC .. B66B 9/16; B66B 9/08; B66B 9/193; B66B 5/24; B66B 9/083; F16D 13/12; B16D 51/04
See application file for complete search history.

(56) References Cited

U.S. PATENT DOCUMENTS

| | | | |
|---|---|---|---|
| 607,912 A * | 7/1898 | Bull | A62B 1/10 |
| | | | 182/236 |
| 753,319 A * | 3/1904 | Saunders | E21B 19/084 |
| | | | 173/28 |

(Continued)

FOREIGN PATENT DOCUMENTS

| | | | | |
|---|---|---|---|---|
| CN | 101946104 A | * | 1/2011 | ............. F16D 65/14 |
| CN | 104310167 A | | 1/2015 | |

(Continued)

OTHER PUBLICATIONS

Machine Translation of CN 101946104.*

(Continued)

*Primary Examiner* — Diem M Tran
(74) *Attorney, Agent, or Firm* — Parlee Mclaws, LLP

(57) ABSTRACT

A knockdown, portable lift is relatively compact and lightweight for transport and use where there is no existing means for lifting a load between a lower surface and an upper surface or where the existing means cannot be used. Components of the lift are stored in a base portion of the lift and are assembled on site for forming a lift frame extending between the upper and lower surfaces. A platform and drive assembly are supported on the lift frame and are driven together up and down tracks on each side of the lift frame using a rotary drive, such as a hand crank or electric motor, to power the drive assembly. The drive assembly is operable by a person on or off the platform from either the upper or lower surface or traversing stairs over which the platform is moving. The drive assembly incorporates a unique overspeed braking system and a unique clutch arrangement.

7 Claims, 19 Drawing Sheets

Related U.S. Application Data

(60) Provisional application No. 62/209,094, filed on Aug. 24, 2015.

(51) Int. Cl.
  *B66B 9/16* (2006.01)
  *F16D 13/12* (2006.01)
  *F16D 49/04* (2006.01)
  *F16D 51/04* (2006.01)
  *F16D 59/00* (2006.01)

(52) U.S. Cl.
  CPC .............. *B66B 9/193* (2013.01); *F16D 13/12* (2013.01); *F16D 49/04* (2013.01); *F16D 51/04* (2013.01); *F16D 59/00* (2013.01)

(56) References Cited

U.S. PATENT DOCUMENTS

| | | | | |
|---|---|---|---|---|
| 756,578 A | * | 4/1904 | Camp | B65G 67/40 |
| | | | | 414/385 |
| 884,059 A | * | 4/1908 | Albrecht | B66F 5/00 |
| | | | | 414/743 |
| 3,266,598 A | * | 8/1966 | Henne | B66B 9/16 |
| | | | | 212/292 |
| 2012/0139197 A1 | * | 6/2012 | Livingston | A61G 5/066 |
| | | | | 280/5.22 |

FOREIGN PATENT DOCUMENTS

| | | | |
|---|---|---|---|
| GB | 2431914 A | | 5/2007 |
| JP | H0663168 A | * | 3/1994 |
| JP | 2003160287 A | | 6/2003 |
| KR | 19990060559 A | * | 7/1999 |

OTHER PUBLICATIONS

Search Report and Written Opinion issued on International PCT Patent Application No. PCT/CA2016/050998, dated Nov. 16, 2016.
Machine English translation of Chinese Patent Application No. CN104310167A, Jan. 28, 2015.
Machine English translation of Japanese Patent Application No. JP2003160287A, Jun. 3, 2003.

* cited by examiner

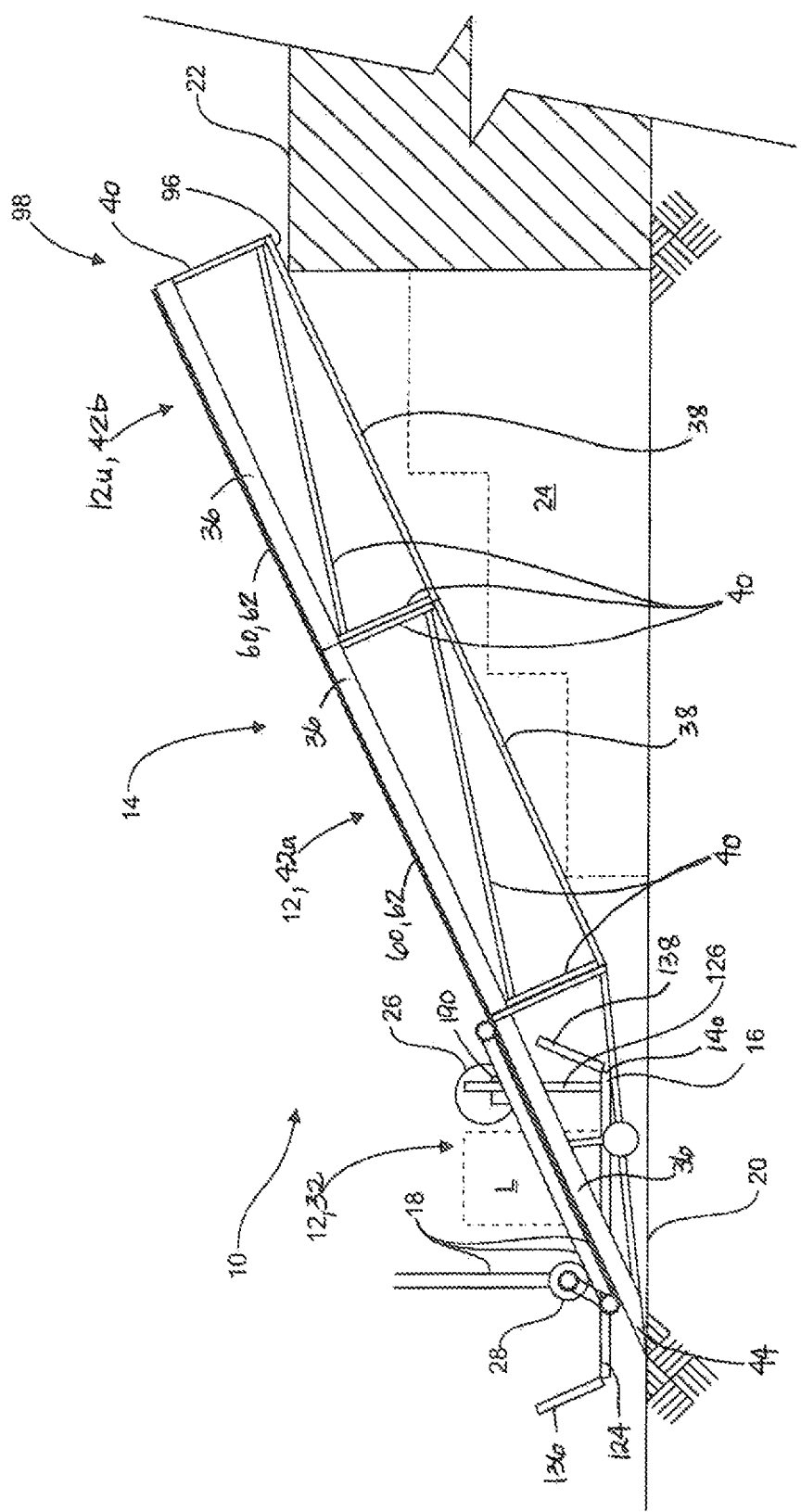

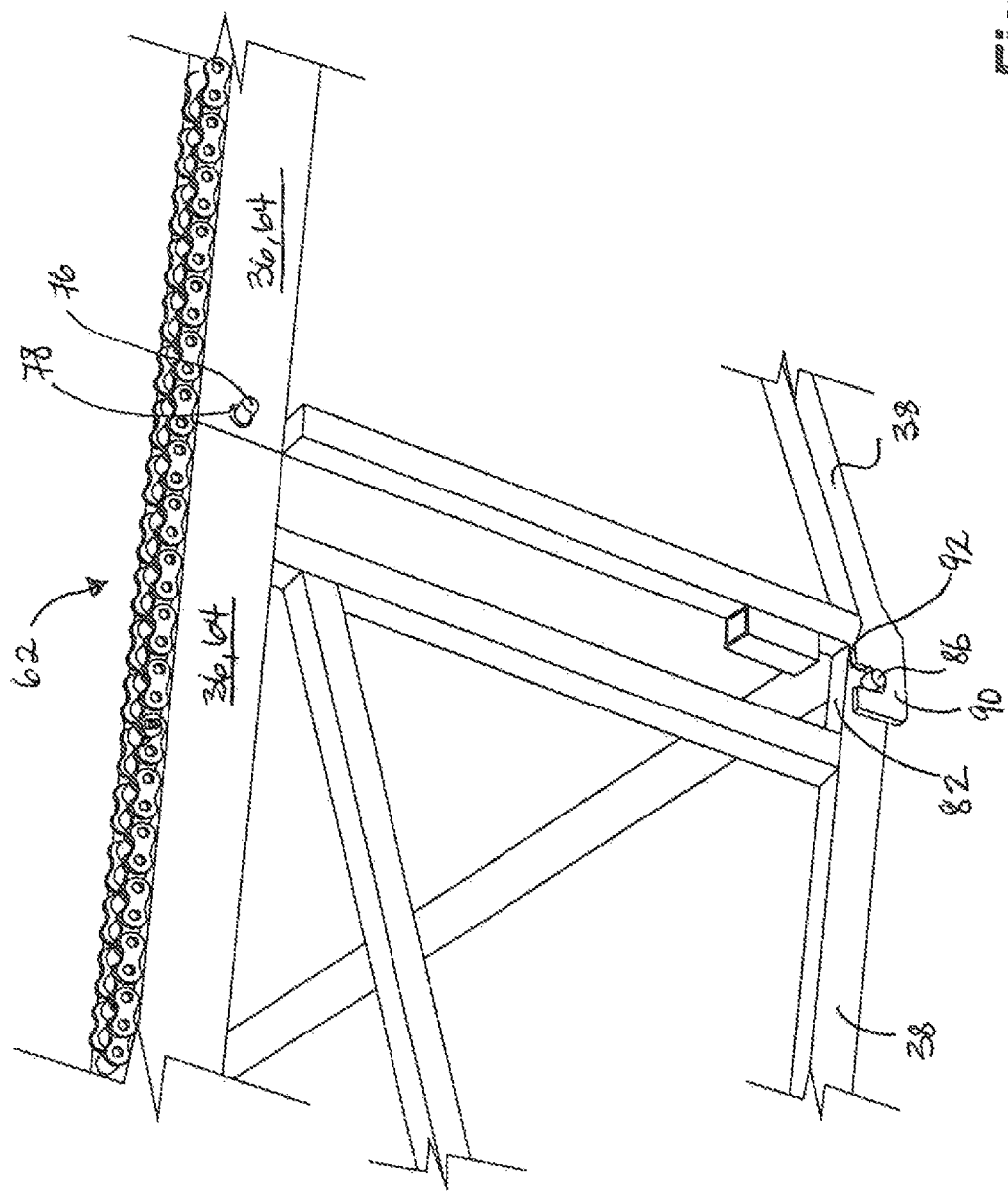

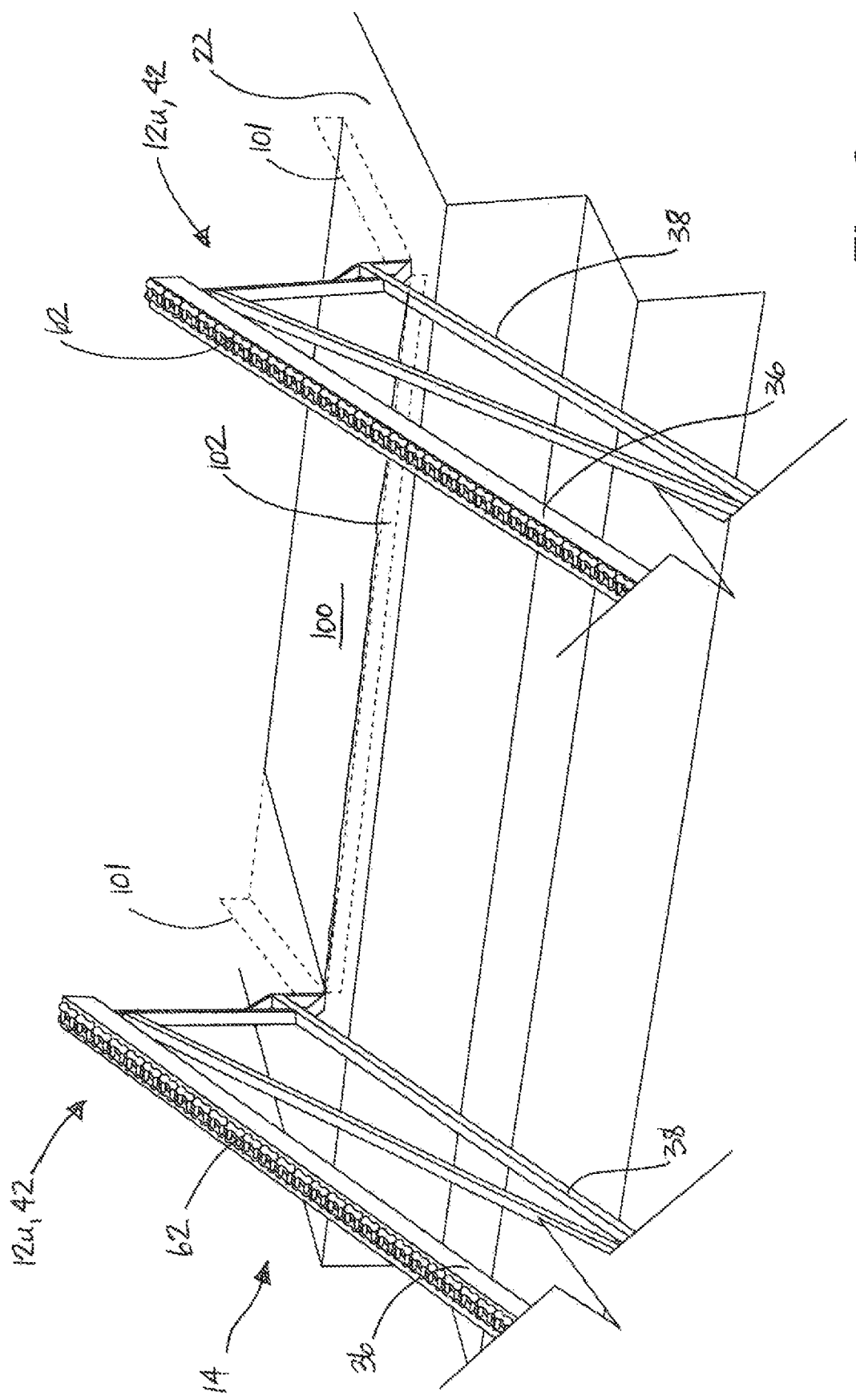

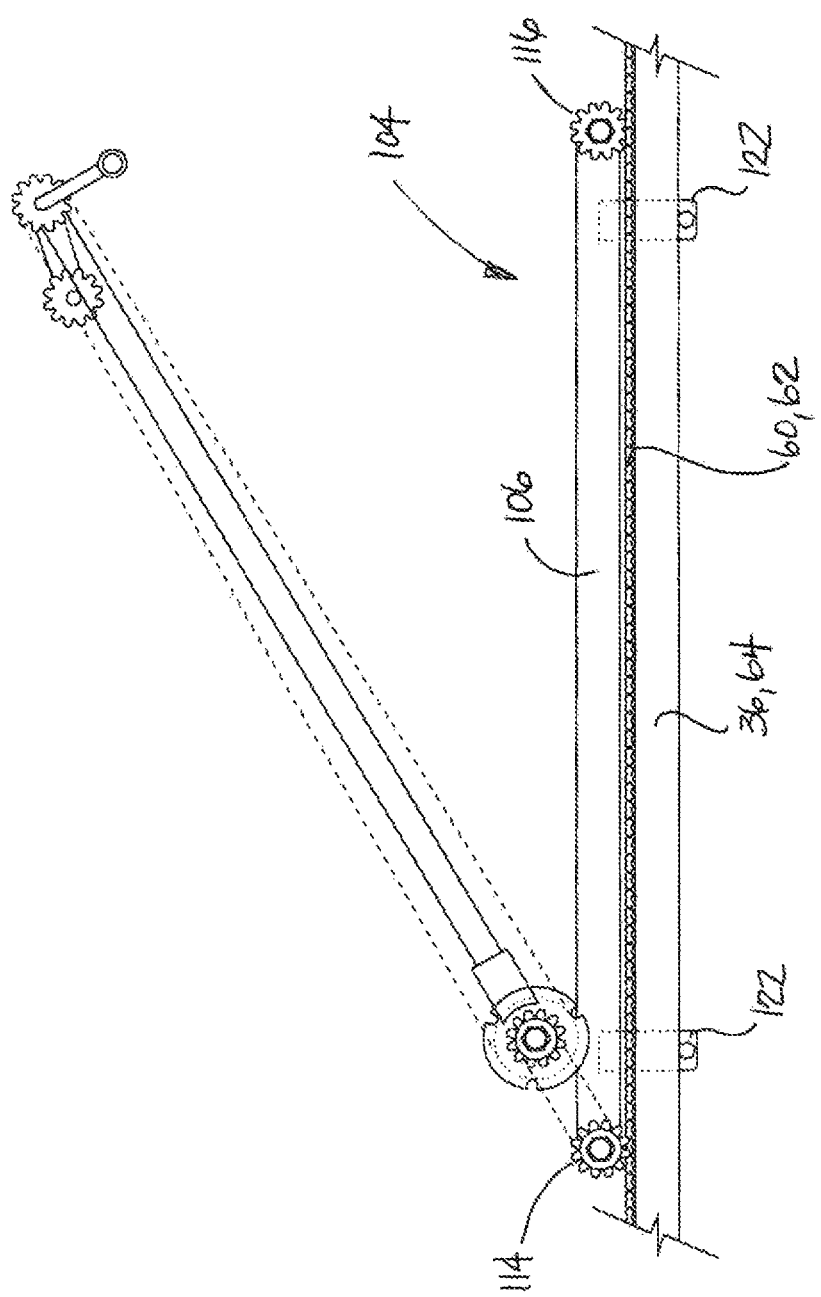

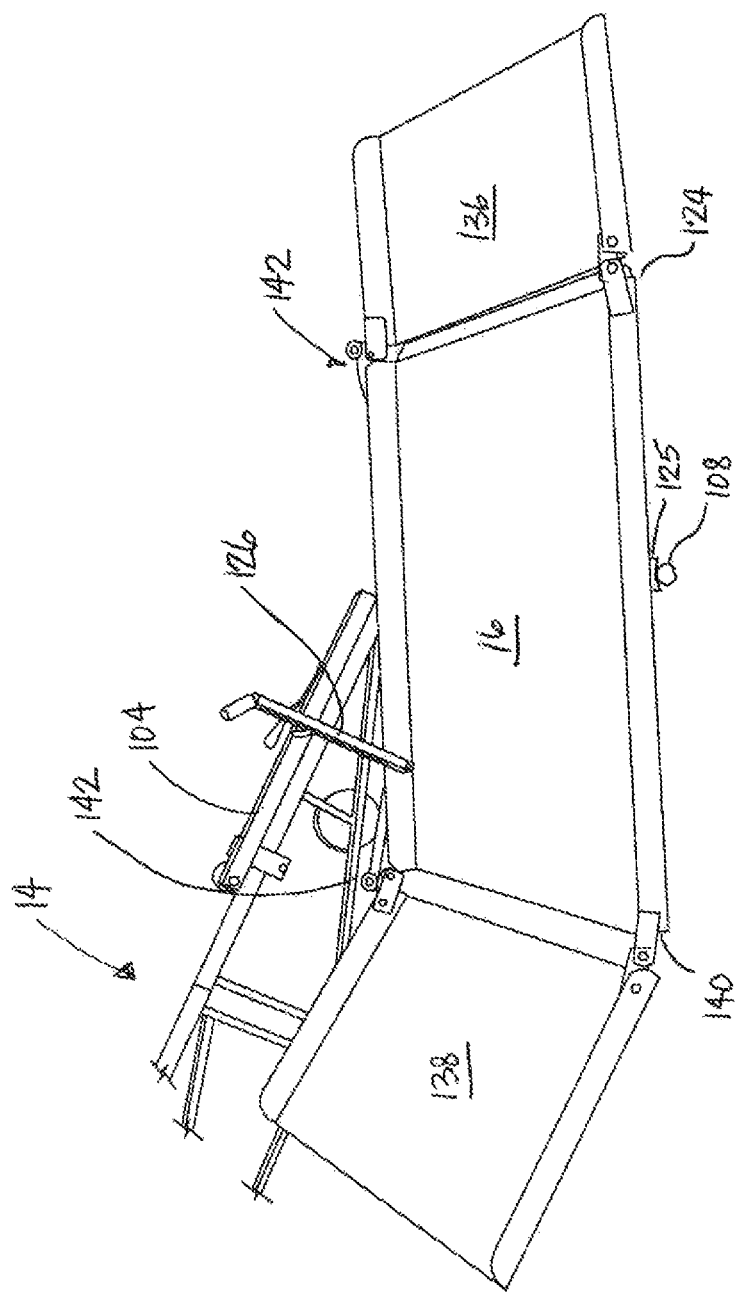

COMPACT PORTABLE LIFT ASSEMBLY

CROSS-REFERENCE TO RELATED APPLICATIONS

This application is a divisional of U.S. application Ser. No. 15/754,977, filed Feb. 23, 2018, which claims the benefit of U.S. Provisional Application 62/209,094, filed Aug. 24, 2015, and the file contents of each are expressly incorporated herein by reference in their entirety.

FIELD

Embodiments herein relate to portable lifts for providing access over steps and height barriers, otherwise insurmountable by wheelchairs, dollies and the like.

BACKGROUND

Stairs and height barriers, such as curbs, elevated doorways on small airplanes or other vehicles and elevated platforms, present challenges when trying to move a load up and down thereover using apparatus such as dollies, other small wheeled vehicles, strollers and wheelchairs and the like.

In some cases lifts or specialized access devices, such as ramps, are available on site. Such apparatus can be either permanently installed or stored for use at the site to assist with moving the load over the height barrier. Examples include large ramps for moving people, freight or equipment from the ground into buildings, aircraft or other types of vehicles. Many people with mobility problems, such as those in wheelchairs, have lifts or specialized access permanently located to access their own homes. Such apparatus are generally expensive and are not portable.

Access over a height barrier is restricted where such apparatus are not readily available. Thus, it becomes problematic to transport loads up and down over such height barriers.

As most houses and public buildings have stairs to at least the main floor, persons with impaired mobility or persons moving loads on a wheeled dolly may be precluded from access thereto. In many cases, delivery services and transport services for the mobility impaired will not deal with stairs. Thus, access is restricted unless there is an existing ramp or fixed lift. In some cases, even a ramp is insufficient to provide safe access where the user is unable to manually roll their wheelchair up the ramp and/or are unable to manually govern the speed thereof when going down the ramp. Further, ramps may be impractical due to the geometry and length required At small airports, parts of large airports and in remote landing locations there is little or no accommodation for providing access to small planes. Bush planes, which often land on water, snow, grass or ice, are not typically equipped with fixed lift apparatus, however are often required to pick up a variety of loads, including but not limited to freight, fuel drums and people in wheelchairs or with mobility impairment.

Further, the problem extends to recreational vehicles, access stages, tour buses, boats, or anywhere there is a height barrier.

Thus, there is interest in providing simple, cost effective portable lift apparatus that are readily transportable from location to location, in a variety of vehicles including, but not limited to passenger vehicles and vans, small aircraft and boats and can be used for transporting loads over stairs and between the ground and an elevated location.

SUMMARY

Embodiments of a knockdown portable lift taught herein are readily transportable as a compact and lightweight unit that can be stored and transported in the trunk of a car, in a van or bus, in the cargo space of a small plane, in boats and other vehicles. The components are relatively lightweight and are storable within a base of the lift for forming a transportable unit, such as a wheeled unit. A lift frame is readily assembled on site to span from a lower surface to an upper surface. A platform supports the load to be moved. The platform is driven up and down the lift frame by a drive assembly which moves with the platform. The lift can be operated by a person who is standing on the lower surface, on the upper surface, who is traversing stairs over which the lift frame is assembled or who is on the platform. A rotary drive to power the lift is lightweight and portable such as a hand crank or a powered rotary drive such as a battery operated power drill or a small electric motor. The drive assembly incorporates a unique overspeed braking apparatus to ensure safe operating speeds and a unique clutch for ensuring movement of the platform and load is initiated by the operator and not by the load acting thereon.

In one broad aspect, a knockdown, portable lift for reversible assembly between a lower surface and an elevated surface for moving a load therebetween comprises a plurality of modular trusses for connecting therebetween and forming a lift frame having parallel right and left sides extending between the lower and elevated surfaces. A platform supports the load, the platform being supported for movement along the lift frame. A drive assembly is operable between the platform and the frame for moving the platform and the load up and down along the frame, wherein the drive assembly moves along the lift frame with the platform.

In another broad aspect, a knockdown, portable lift for reversible assembly between a lower surface and an elevated surface for moving a load therebetween comprises a plurality of modular trusses for connecting therebetween and forming a lift frame having parallel right and left sides extending between the lower and elevated surfaces. A platform supports the load, the platform being supported for movement along the frame. A drive assembly is operable between the platform and the frame for moving the platform and the load up and down along the frame. An overspeed braking apparatus is operatively connected to the drive assembly and moveable therewith for slowing movement of the platform at speeds above a pre-set operating speed.

In yet another broad aspect, a knockdown, portable lift for reversible assembly between a lower surface and an elevated surface for moving a load therebetween comprises a plurality of modular trusses for connecting therebetween and forming a lift frame having parallel right and left sides extending between the lower and elevated surfaces. A platform supports the load, the platform being supported for movement along the lift frame. A drive assembly is operable between the platform and the lift frame, for driving a driven member therealong for moving the platform and the load up and down along the lift frame. A clutch is operatively connected between the drive assembly and the driven member to permit movement of the platform in response to input from a rotary drive and to prevent movement in response to input to the driven member.

In still another broad aspect, a method for transport of a knockdown portable lift, operable between a lower surface and an elevated surface, for assembly and use for lifting and lowering a load therebetween, the method comprises providing a unit comprising a generally triangular base supporting, for transport within the base of a plurality of rectangular trusses having sections of a track thereon for connection to the base and to adjacent rectangular trusses for forming right and left substantially parallel sides of a lift frame and continuous tracks formed thereon, a platform to be supported on the lift frame for movement up and down between the lower and elevated surfaces and supporting the load thereon; a drive assembly drivably connected to the lift frame and platform; and a rotary drive for connection to one or more input shafts on the drive assembly for driving the platform. The unit is transported to the lower surface. The plurality of trusses are connected to the base and therebetween for forming the lift frame. The platform is supported on the lift frame. The drive assembly is engaged with the platform and the continuous tracks for movement of the drive assembly with the platform and the rotary drive is connected to one of the one or more input shafts for driving the platform and the drive assembly along the lift frame.

After use, the lift is disassembled by reversing the steps of assembly. The drive assembly may remain mounted to the base on a drive frame moveably supported thereon.

In embodiments, the overspeed braking assembly comprises a brake and an escapement which, together with spring mounted bearings, is capable of both high load and high sensitivity. Conventional overspeed braking assemblies are typically capable of only one or the other. Further, in embodiments, the brake is a band brake and the braking torque on the drum of the brake is almost independent of friction between the band and the drum.

In embodiments, the drive assembly comprises a clutch which permits movement of the platform to input applied only to the one or more input shafts and limits movement of the platform when input, generally an impetus from the load, acts on driven components of the lift.

BRIEF DESCRIPTION OF THE DRAWINGS

FIG. 1 is a side view of an embodiment of a portable lift, assembled to span from a lower surface to an elevated surface, with or without stairs extending therebetween, shown in dashes lines;

FIG. 2A is a side view of a wheeled unit comprising components of a portable lift, transported to a site for assembly on a lower surface;

FIG. 2B is a side view of a generally triangular lower portion or base, set on the lower surface, illustrating a right side triangular truss, of substantially identical right and left side trusses, and having a drive frame and drive components drivably supported thereon;

FIG. 2C is a side view of a first, generally rectangular truss being connected between lower flanges to the right side truss of the base, assembly of the left side rectangular truss being substantially identical;

FIG. 2D is a side view according to FIG. 2C, upper flanges of the trusses having been connected for forming a secure connection therebetween;

FIG. 2E is a side view of a subsequent generally rectangular truss connected to the first rectangular right side truss according to FIGS. 2C and 2D, for spanning the frame from the lower surface to the elevated surface.

FIG. 5 is a side view according to FIG. 4, the connection having been completed between the upper and lower flanges and forming a continuous track of the drive therebetween;

FIG. 6 is a perspective view according to an embodiment having a vestibule plate connected between lower flanges on the right and left uppermost trusses and showing optional raised edges in dotted lines on the right side of the plate and an optional flare and raised edges in dotted lines on the left side of the plate;

FIG. 7 is a side view of the drive frame, having sprockets for engaging the tracks on the right and left sides of the frame, and having a drive arm supported thereon for supporting components of the drive, including a clutch;

FIGS. 8A to 8D illustrate supporting the platform on the drive frame, more particularly, FIG. 8A is a partial view of the platform supported adjacent a lower end on a cross-member of the drive frame;

FIG. 8B is a perspective view of level adjusters connected between the drive frame and the platform for suspending the platform between the parallel drive frame members for leveling the platform for travel along the lift frame, a first flap connected a first end of the platform folded down for loading and unloading and a second flap at an opposing end folded to an intermediate raised position for limiting the travel of the load on the platform;

FIG. 8C is a perspective view of the level adjusters and z-springs connected thereto; and FIG. 8D is a perspective view of the platform illustrating the first flap folded onto the platform and the second flap latched at an intermediate angled position

FIG. 14A illustrates interaction of the toothed gear and pawl at a normal pre-set speed, a leading end of the pawl being rotated by a tooth on the gear and overcoming a latch spring, the leading end being rotated toward the drum and a trailing end being rotated inward between teeth on the gear;

FIG. 14B illustrates action of the latch spring at the normal speed to bias the leading end toward the gear for rotating the trailing end away from the gear allowing teeth to pass thereby; and FIG. 14C illustrates operation at overspeed wherein the latch spring cannot act quickly enough to bias the leading end toward the gear, the trailing end becoming latched to the toothed gear, a bearing supporting the pawl being kicked back to engage the drum for transferring load thereto.

DESCRIPTION

Figure 2A:
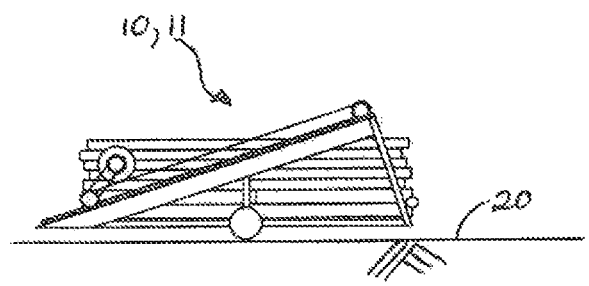
FIGS. 2A to 2E are simplified side views illustrating assembly of a lift frame for the lift of FIG. 1, more particularly.

A portable, knockdown lift is provided for use as a general purpose loader for a wide variety of loads, including but not limited to people in wheelchairs. The lift is designed to be reduced to a compact and relatively light package suitable for storage and portability, such as in the trunk of a car or a cargo hold of a small aircraft or boat.

Embodiments taught herein, when knocked down, measure about 3 ft by 3 ft by about 1 ft, and weigh less than about 90 lbs. The heaviest individual part of the lift weighs about 25 lb so that the lift can be assembled by a single individual with little or no assistance. The lift can generally be assembled for use in under 5 minutes and has a load bearing and lifting capacity of up to about 700 lb when lifting a person and up to about 1200 lb when lifting freight.

Using embodiments of the portable lift taught herein, an operator can move a load up and down over height barriers, including stairs and raised platforms without stairs. With conventional scaling for increased span, there is no technical limit to the height of the lift. However lifts over 5 ft may be restricted by regulatory controls and could be classified as elevators, falling under elevator codes.

Embodiments of the portable lift can also serve as a primary access device for a residence or other structure because it is relatively inexpensive and requires little or no modification to the house as do most fixed lifts. Where individuals do not want a visible fixed device affixed to their home for a prolonged period, embodiments of the lift can be set up in a few minutes only when needed.

The portable lift is readily transportable in a wide variety of vehicles including, but not limited to handicap service vehicles, cars and vans, small planes, trains, recreational vehicles, tour buses and boats. The portable lift is also readily storable on site such as at airports and other public buildings for use in accessing buildings, planes, vehicles, stages and loading docks and other elevated locations.

Having reference to FIG. 1, in an embodiment, the knockdown portable lift 10 generally comprises a plurality of modular trusses 12 for connecting therebetween and forming a knockdown frame 14, a deck or platform 16 for supporting the load L, and a drive assembly 18, operable between the platform 16 and the frame 14, for moving the platform 16 and the load L carried thereon, along the frame 14. The frame 14, when assembled, extends between a first lower surface 20 and a second elevated surface 22. The frame 14 can be assembled over a set of stairs 24, however, there need not be a set of stairs 24 between the lower and elevated surfaces 20, 22.

Further, the portable lift 10 comprises an overspeed braking apparatus 26, which acts to maintain the platform 16 and load L at a safe, pre-set descent speed. The overspeed braking apparatus 26 also acts to limit impact loading and to slow the load at a controlled rate to a stop. The lift 10 further comprises a clutch 28 which prevents movement of the platform 16 unless initiated by the operator.

Frame and Load Platform

Having reference to FIGS. 2A to 2E, the plurality of modular trusses 12 are assembled on site to form the lift frame 14.

As shown in FIG. 2A, in an embodiment, the lift 10 is transported to the site as a unit 11, such as a wheeled unit, described in greater detail below.

Figure 2B:
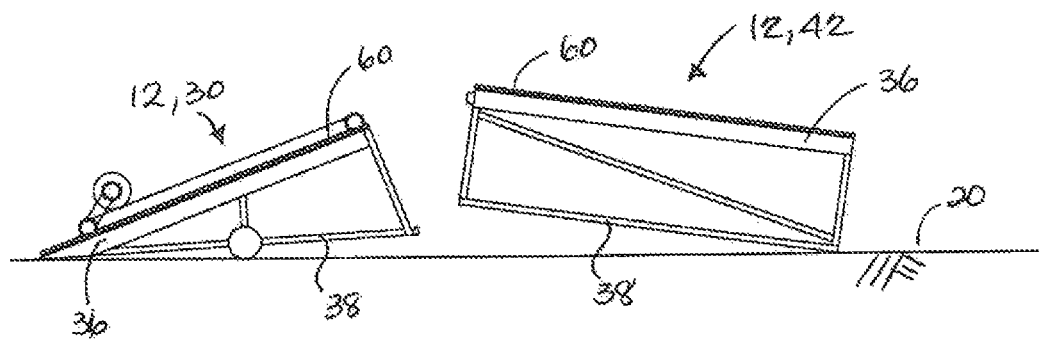
Figure 3:
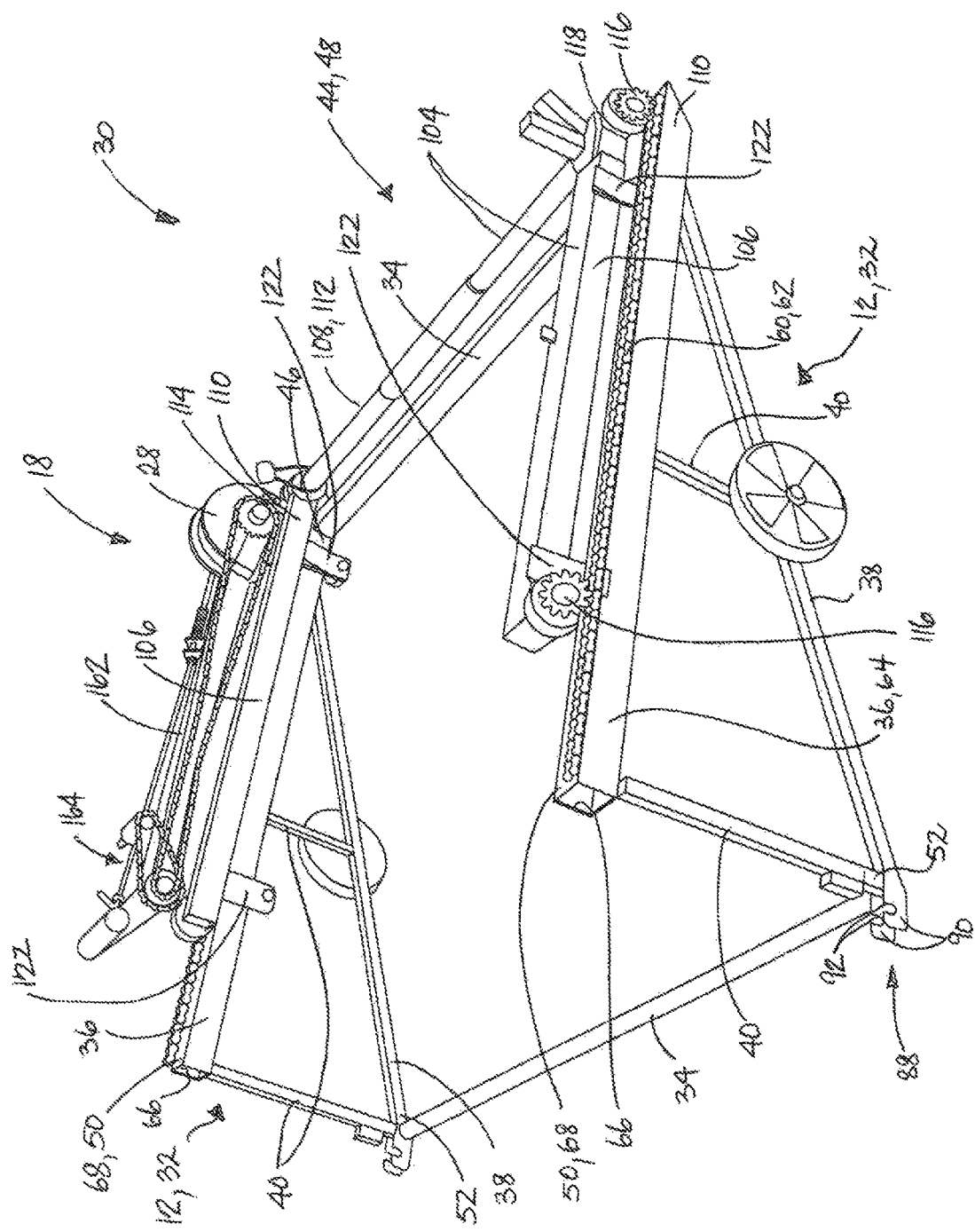
FIG. 3 is a rear perspective view of the base, illustrating span members connecting between the right and left side trusses for forming the generally triangular base, the drive frame supported thereon and illustrating embodiments of connection means on upper and lower flanges for connecting to the rectangular trusses.

Having reference to FIGS. 2B and 3, a generally triangular lower section or base 30 comprises right and left triangular shaped trusses 32, spaced apart using span members 34 connected therebetween. Each triangular truss 32 further comprises an upper flange 36, a lower flange 38 and a truss web structure 40 extending therebetween.

Figure 2C:
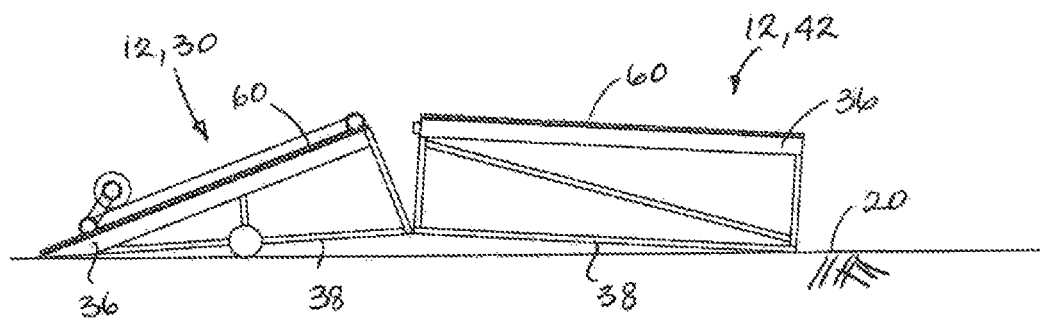
Figure 2D:
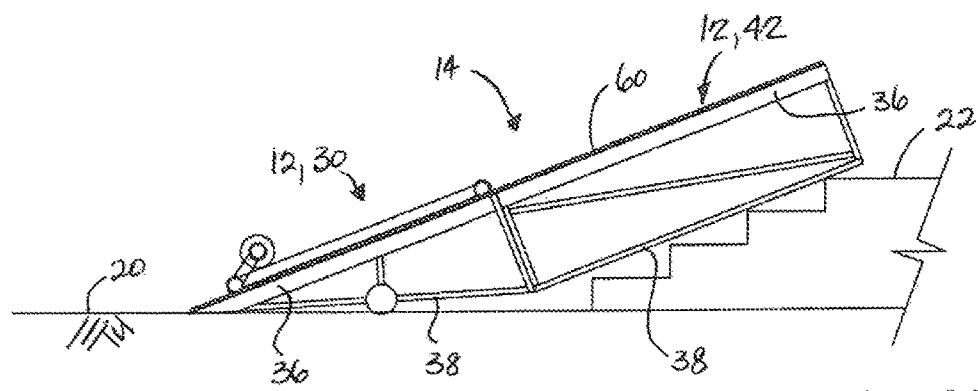

As shown in FIGS. 2C to 2D, one or more rectangular trusses 42, each comprising an upper and lower flange 36, 38 and a truss web structure 40, are removeably connected to each of the triangular right and left trusses 32,32 of the base 30 and to adjacent rectangular trusses 42, in series, to form right and left sides of the lift frame 14. Each side of the lift frame 14 extends from the lower surface 20 to the elevated surface 22. The supported length and depth of the truss web 40 are such that the lower truss flange 38 clears steps or other height barriers over which the lift 10 is positioned.

An apex 44 of the base 30, formed by a span member 34 and first ends 46 of the triangular trusses 32, forms a lower end 48 of the lift frame 14 and rests on the lower surface 20. Opposing second ends 50, 52 of the upper and lower flanges 36,38, of each of the right and left triangular trusses 32, are each connected respectively to the upper and flanges 36,38 of a first, lower end 54 of a first rectangular truss 42a on each side. If required to span the distance between the lower surface 20 and the upper surface 22, second and subsequent rectangular trusses 42b . . . are connected to the upper and lower flanges 36, 38 at second opposing ends 56,58 of each of the rectangular trusses 42, on each side.

The upper flange 36 of each of the right and left triangular trusses 32 in the base 30 and the one or more rectangular trusses 42 on each side of the lift frame 14, support a section 60 of the drive assembly 18, such as a rack or chain in a rack and pinion drive. When the plurality of trusses 12 are assembled, the sections 60 form two parallel, continuous, tracks 62 one along each of the right and left side of the lift frame 14.

Connections between the plurality of trusses 12 can be made in a variety of different ways using conventional means, including but not limited to, pin and socket connections, latches, threaded connectors and the like.

Figure 4:
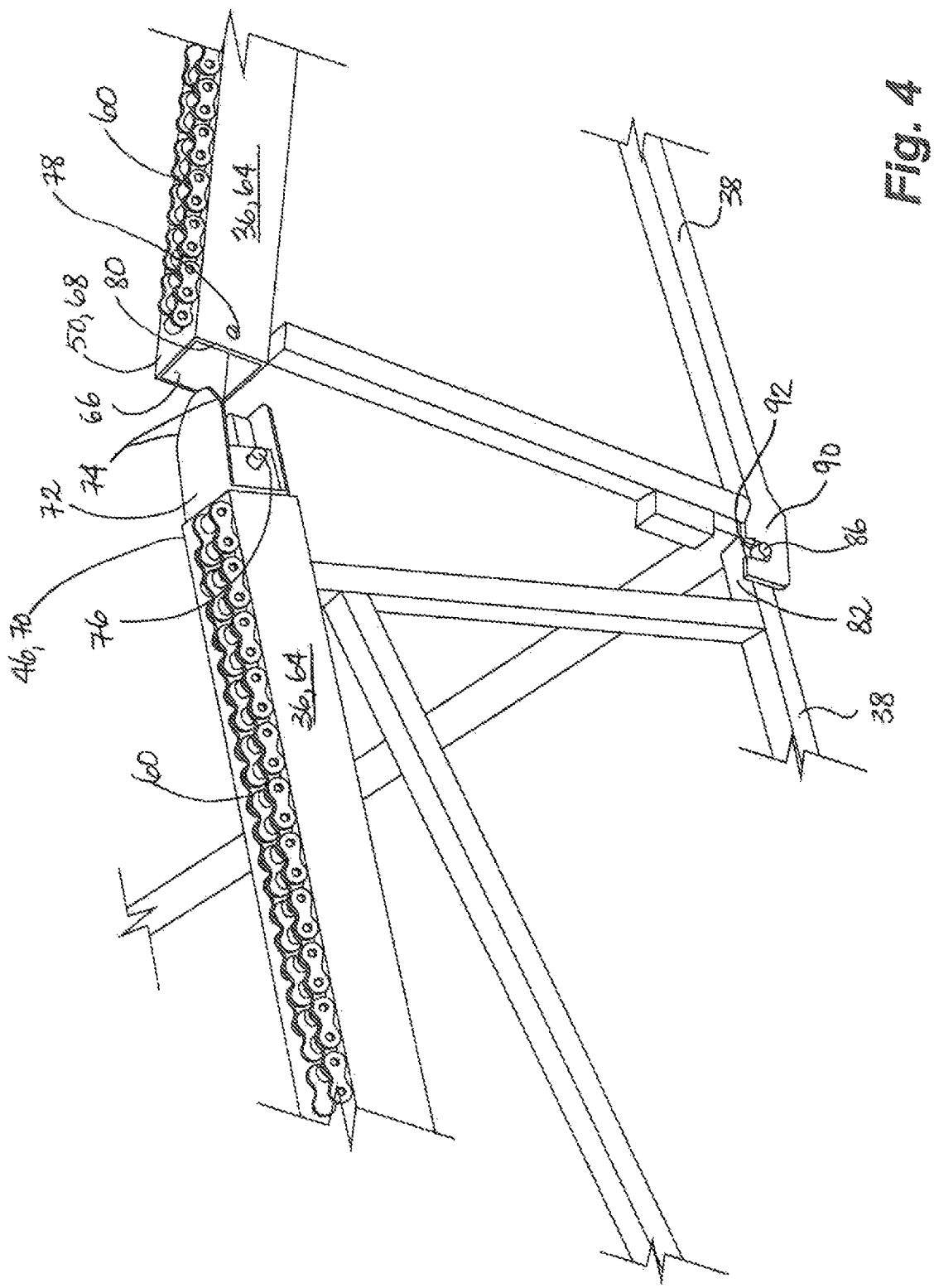
FIG. 4 is a side view of a partial connection between trusses illustrating an embodiment of connection means, a connection having been first made between the lower flanges of the trusses and an awaiting connection remaining to be made for connecting between the upper flanges of the trusses.

In an embodiment, as shown in FIGS. 3 to 5, to ensure secure, safe connection between the plurality of trusses 12 during assembly of the lift frame 14, the trusses 12 are designed to interconnect in only one way, thereby preventing improper connection.

The top flange 36 of each of the plurality of trusses 12 is fit with a male/female connection for snap together assembly. The top flange 36 comprises a square tubular member 64 having a bore 66 formed therethrough. A second end 68 of the upper flange 36 is open, forming a female socket and a first end 70 is fit with a male pin 72. The male pin 72 is shaped having one or more sloped edges 74 to aid in guiding the pin 72 into the socket 68 and for coupling the male pin 72 therein. A spring pin 76 is formed on one truss end 68, 70 and engages a hole 78 on the other truss end 70,68 for locking the trusses together. In the embodiment shown, the spring pin 76 is formed on the male pin 72 and the hole 78 is formed in a wall 80 of the female socket 68.

An engagement member 82 extends axially from the lower flange 38 at a second end 84 thereof. Lugs 86 extend radially outwardly from each side of the engagement member 82. A hook 88, comprising two spaced apart axially extending hook members 90, 90, best seen in FIG. 3, each having a transverse U-shaped recess 92 therein, extends outwardly from the lower flange 38 on the second end thereof 52. When the trusses 12 are connected, the engagement member 82 fits between the two axially spaced hook members 90, 90, nesting the lugs 86,86 formed thereon in the transverse U-shaped recesses 92, 92.

A first connection between lower flanges 38,38 must be made before a second connection between the top flanges 36,36 will be permitted. If the operator connects the top flanges 36,36, the truss 12 having the engagement member 82 cannot be lifted to drop the lugs 86,86 into the transverse recesses 92,92 of the hook members 90,90 and therefore connection between the lower flanges 38,38 cannot be made.

As shown in FIG. 1, a leg 96 on a bottom of the lower flange 38 of each right and left uppermost truss 12u at an uppermost end 98 of the frame 14 engages the elevated surface 22.

In embodiments, connection between the uppermost end 98 of the frame 14 and the elevated surface 22 can be used to secure the frame 14 thereto. By way of example, hooks or other means could be used to engage between the frame 14 and apparatus at the door of a small plane or other type of vehicle.

In embodiments, as shown in FIG. 6, a solid vestibule plate or flexible mat 100 can be removeably connected to extend between the lower flanges 38,38 of the uppermost right and left trusses 12u and onto the elevated surface 22. The plate or mat 100 can be connected between the trusses 12u using the engagement members 82 formed thereon or to hooks provided for the purpose.

Further, as shown in dotted lines on the right side of the plate in FIG. 6, in embodiments, the plate 100 may be formed with raised edges 101 to aid in guiding the load L onto the platform 16. As shown in dotted lines on the left side of FIG. 6, the raised edges 101 and the plate 100 can also be flared outwardly as the plate 100 extends away from the frame 14 to provide a wider entrance, which narrows at the platform 16.

The plate or mat 100, resting on the elevated surface 22, can have several functions. The plate or mat 100 prevents the uppermost trusses 12u from moving away from one another at or near the elevated surface 22, when the platform 16, moveable along the tracks 62 on the top flanges 36 of the trusses 12, is located at or closer to the lower surface 20. Alternatively, a span member 102 can be removeably connected between the lower flanges 38,38 of the uppermost trusses 12u for maintaining the spacing between the right and left sides of the lift frame 14.

The plate or mat 100 can also provide a transition from the elevated surface 22 onto the platform 16 when it is located at the elevated surface 22. This may be particularly useful for loading wheeled vehicles, such as wheelchairs, dollies or strollers onto the platform 16, where a forward momentum may act to displace the lift frame 14 away from the elevated surface 22. The weight of the load on the plate or mat 100 as it begins to move onto the platform 16 aids in preventing the mat 100 and lift frame 14 from moving away from the elevated surface 22.

Figure 2E:
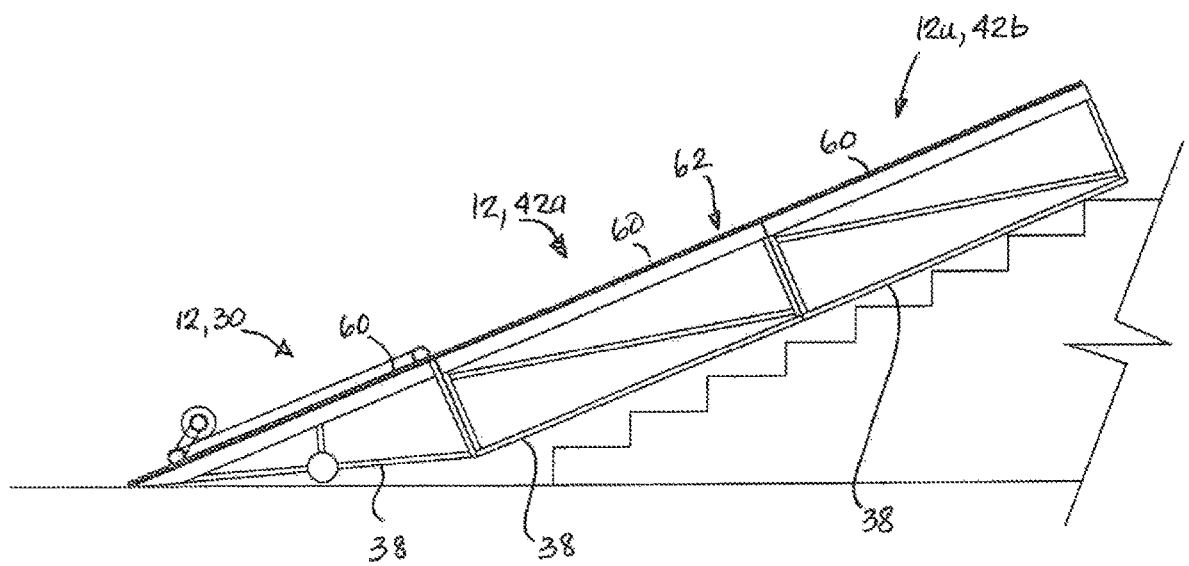

As shown generally in FIGS. 1 and 2E, when the lift frame 14 is assembled to extend between the lower and elevated surfaces 20, 22, the deck or platform 16 is supported thereon for conveyance of the load L up and down the lift frame 14.

In an embodiment, shown in FIGS. 3 and 7, a drive frame 104 comprising two, substantially parallel drive frame members 106 drivably engages the parallel linear tracks 62 supported on each side of the lift frame 14 as previously described. A cross-member 108 spans between lower ends 110 of each of the two parallel drive frame members 106 to maintain structure therebetween. The cross-member 108 also supports a driven shaft 112, which has a driven component of the drive 114 at a first end thereof, for engagement with the continuous, linear tracks 62. The driven component 114 is connected to the drive assembly 18 as described below. Further, sprockets 116 are connected to the opposing end 118 of the driven shaft 112 and opposing ends 120 of each of the drive frame members 106 to further engage the tracks 62. Thus, the drive frame 104 is supported against lateral movement relative to the tracks 62 and is conveniently and efficiently maintained square thereto.

In embodiments, the drive frame 104 is also supported by pairs of under-idlers 122 that are connected to the drive frame 104 and extend therebelow to roll along an underside of the upper flanges 36 of the trusses 12 of the lift frame 14. The under-idlers 122 restrain movement of the drive frame 104 vertically with respect to the lift frame 14. In the embodiment shown, the under-idlers 122 are spaced apart along each of the parallel drive frame members 106 and adjacent the opposing ends 120, 121 thereof in proximity to the sprockets 114,116.

In greater detail, the platform 16 is supportable on the drive frame 104. The platform 16 is pivotally supported adjacent a first, lower end thereof 124 on the drive frame 104, at least at opposing sides thereof, and generally at the lower end 110 thereof.

Figure 8A:
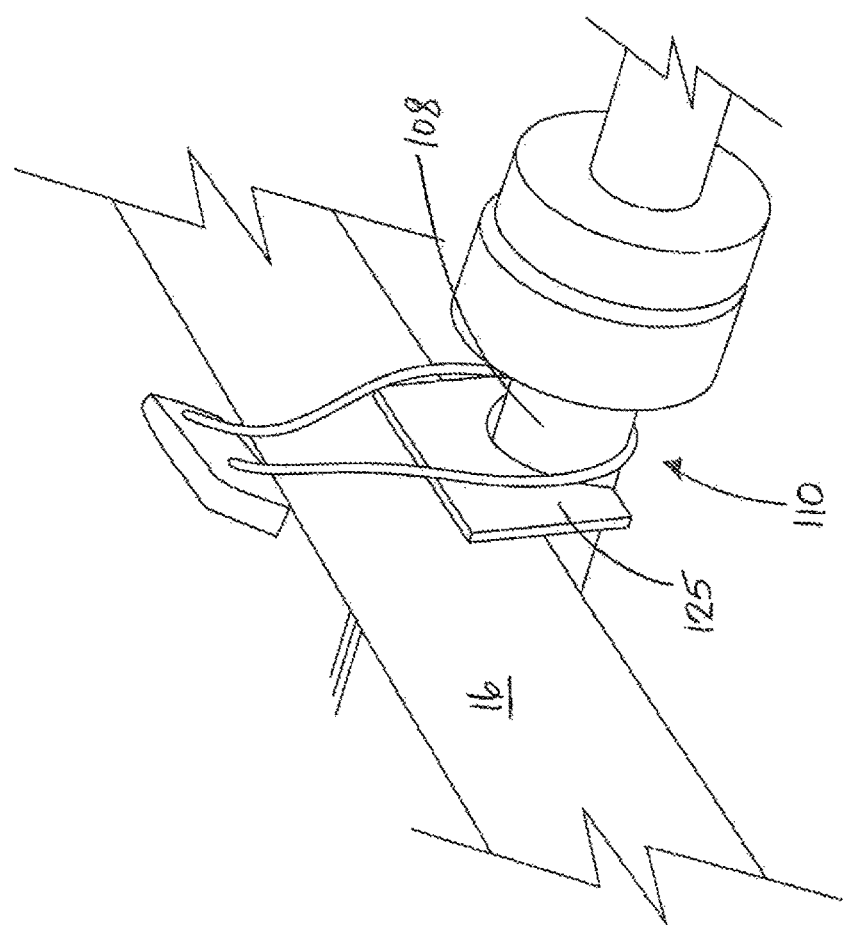

In an embodiment, as shown in FIGS. 1 and 8A, the platform 16 is pivotally supported, such as by U-shaped brackets 125, on the cross member 108. The platform 16 is further supported therealong from the drive frame 104 to hang therebelow. The level of the platform 16 can be adjusted for maintaining the load L in a level position as the platform 16 traverses the lift frame 14.

Figure 8C:
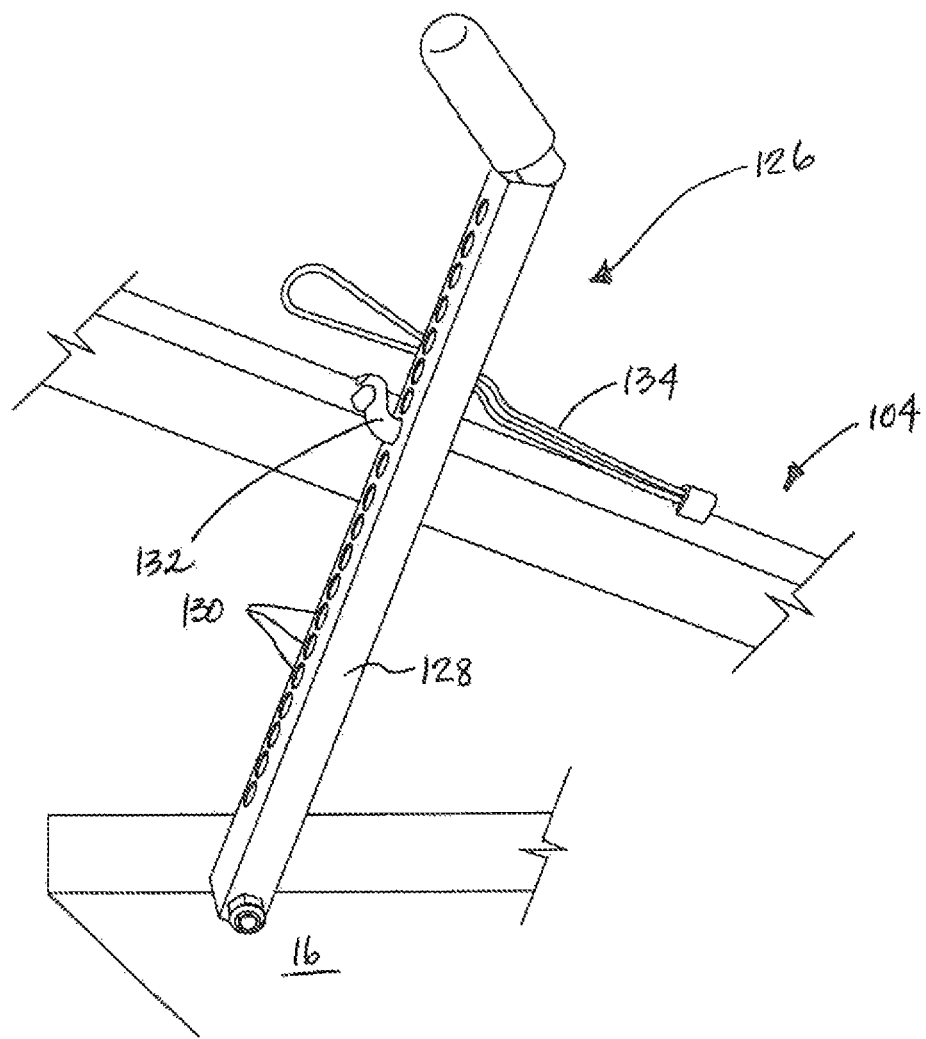

In an embodiment, best seen in FIGS. 8A to 8C, the platform 16 is hung from the drive frame 104 by level adjusters 126, connected mid-way therealong and spaced from the support on the cross-member 108. The level adjusters 126 can also be used to adjust the height of the platform 16 relative to the sloped frame 14, thereby maintaining the platform 16 level for reliably and comfortably carrying the load L. The platform 16 pivots about the support 125 at the cross-member 108 as the level adjusters 126 are adjusted to the varying elevations of the drive frame 104 and the lift frame 14.

As shown in FIG. 8C, each level adjuster 126 comprises an arm 128, extending generally vertically relative to the platform 16 and connected thereto, such as by a bolt or other fastener 129. The arm 128 has a plurality of vertically spaced indexing holes 130 therein to engage a pin 132 extending outwardly from the drive frame 104. A Z-shaped spring latch 134 permits the arm 128 to bias the Z-latch 134 to engage the pin 128, and then snaps behind the arm 128 once fully engaged. For safety, the Z-latch 134 must be forcibly displaced to release the arm 128 from the pin 130.

Figure 8D:
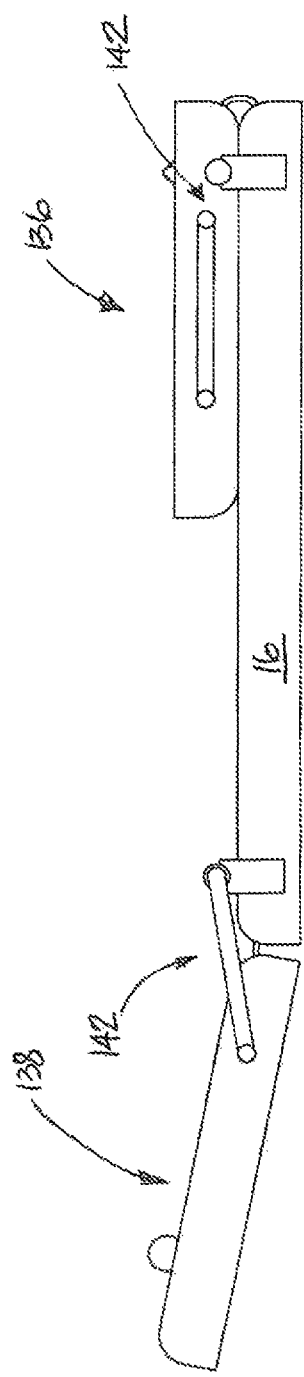

Having reference to FIGS. 8B and 8D, and in an embodiment, the platform 16 further comprises a first flap 136 at the first lower end 124 thereof and a second flap 138 at a second end 140, each of which are rotatably attached to the platform 16. The first and second flaps 136,138 are capable of 180 degree movement relative to the platform 16. The flaps 136,138 are pivotable outwardly to provide a relatively flat transition (FIG. 8B) to each of the upper and lower surfaces 20, 22 when loading and unloading. The flaps 136,138 also pivot inwardly to be folded onto the platform 16 (FIG. 8D) to be compact for portability. Further, the first and second flaps 136,138 can be latched, such as by a hook or other latching mechanism 142, at an intermediate raised position (FIG. 86,8D), to retain the load L on the platform 16 during movement thereof up and down the lift frame 14.

An optional hand rail can be installed on the trusses 12, using sockets or other connecters attached thereto, to provide a further measure of safety, particularly when used for transporting a person, in or out of a wheelchair. Additionally, in the case where the lift is installed over a wide set of stairs, the hand rail provides a secure hand hold for an attendant who may traverse the stairs alongside the platform 16 and who may operate the drive.

Drive and Clutch Apparatus

Any suitable drive assembly 18 can be used to engage between the drive frame 104 and the lift frame 14 for moving the drive frame 104 and platform 16, supported thereon, along the lift frame 14. Depending upon the application and mechanical advantage required, a gear box, or other reducer can be used to aid in the conversion of a rotary input to rotate the driven sprocket 114 and move the drive frame 104 along the lift frame 14.

Having reference to FIGS. 1, 3 and 9 to 11B, in an embodiment the drive assembly 18 is a rack and pinion or sprocket, or chain and cog pinion drive system. The tracks 62 formed on the upper flanges 36 are the rack or chain portion of the drive assembly 18. For ease of discussion, the tracks 62 are further referred to herein as racks 62. The driven component 114 as described above is a driven sprocket.

The driven sprocket 114, operatively connected to the drive frame 104 and platform 16 as described above, are driven by a rotary drive 150, such as a hand crank or motor, releasably connected to an input shaft 152, to move the drive frame 104 and platform 16. The rotary drive 150 is gear-reduced, as necessary, and input therefrom is transmitted to the driven sprocket 114 on the driven shaft 112. The driven shaft 112 is rotated to drive the sprocket 116 on the opposing end 118 thereof.

Figure 9:
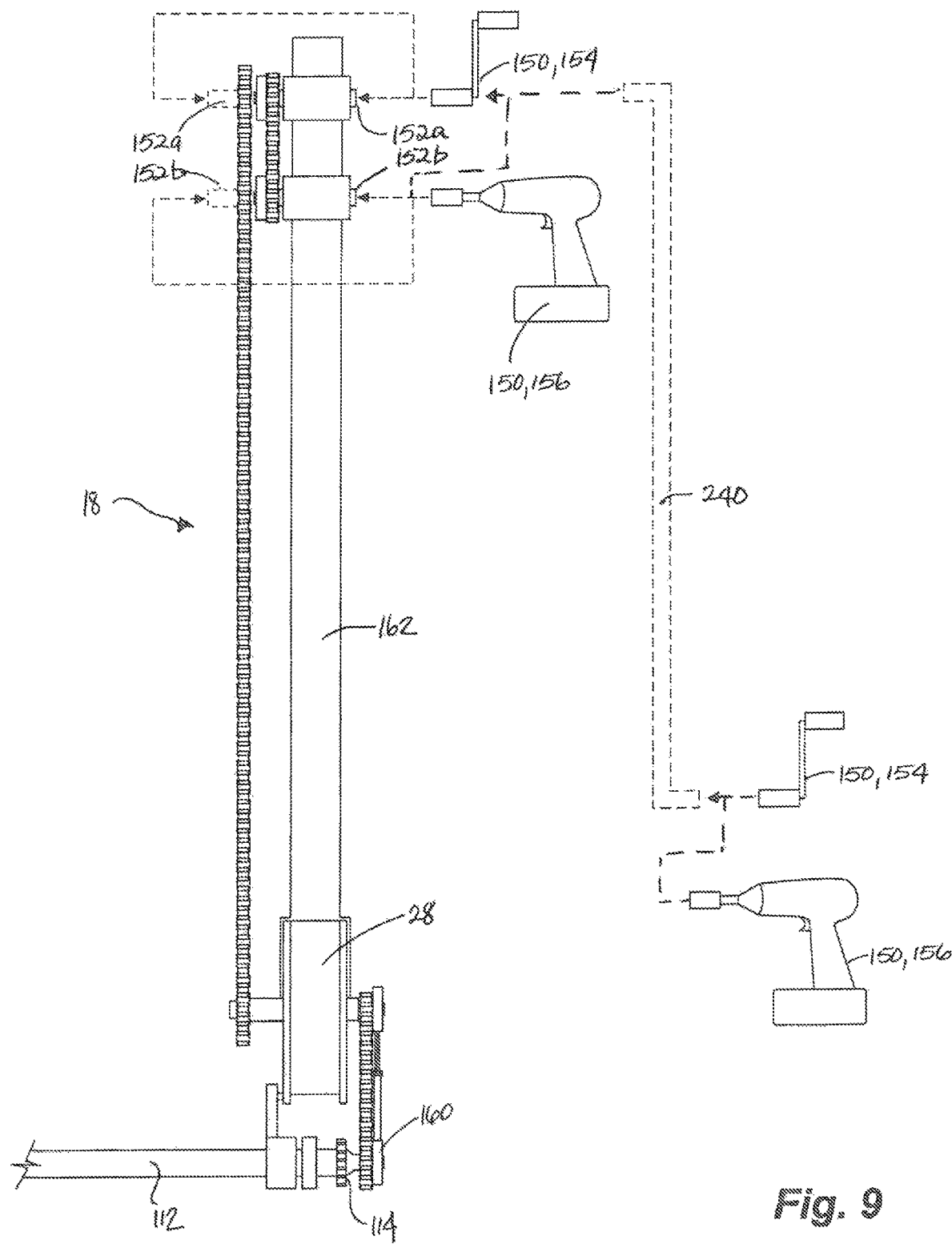
FIG. 9 is a front view of the drive arm illustrating an input shaft and gearing for receiving a hand crank as a rotary drive, an alternate input shaft and gearing for use with a powered rotary drive, such as a power drill, and an articulated extension member for connecting the rotary drive to the input shafts, when the operator is not located adjacent the input shafts.

In embodiments, best seen in FIG. 9, the drive assembly 18 is designed for use with a hand crank 154, to utilize an input force of about 10 pounds and a drive ratio and mechanical efficiency to provide a force along the racks 62 of about 500 pounds so as to result in the force necessary to raise a load of about 700 pounds up the slope of the lift frame 14. With appropriate gearing, an input force of about 800 lbs can be used to raise a load of about 1200 lbs. In the case where a person is transported using the portable lift 10, regulations may restrict the weight to be lifted to less than the maximum load. Applicant is aware that restrictions may limit the weight to about 700 lbs in this case.

The system may also be designed to connect the input shaft 152 to any other type of rotary power device, such as an electrically operated motor 156. Examples of a suitable electrically operated motor 156 include, but are not limited to, a battery powered electric power drill or a wired or wirelessly operated electric motor.

In the case of a power drill or other type of rotary power device 156, the input torque is generally lower than that of the hand crank 154 and may be geared down using at least a secondary chain drive 158. Thus, regardless the input, the drive assembly 18 is appropriately geared to the torque capacity of the rotary input 150.

In embodiments, both a first input shaft 152a, geared to accept rotary input from the hand crank 154 and a second input shaft 152b, geared to handle a rotary input from a power drill or electric motor 156, are connected to the driven sprocket 114 on the driven shaft 112.

Figure 10:
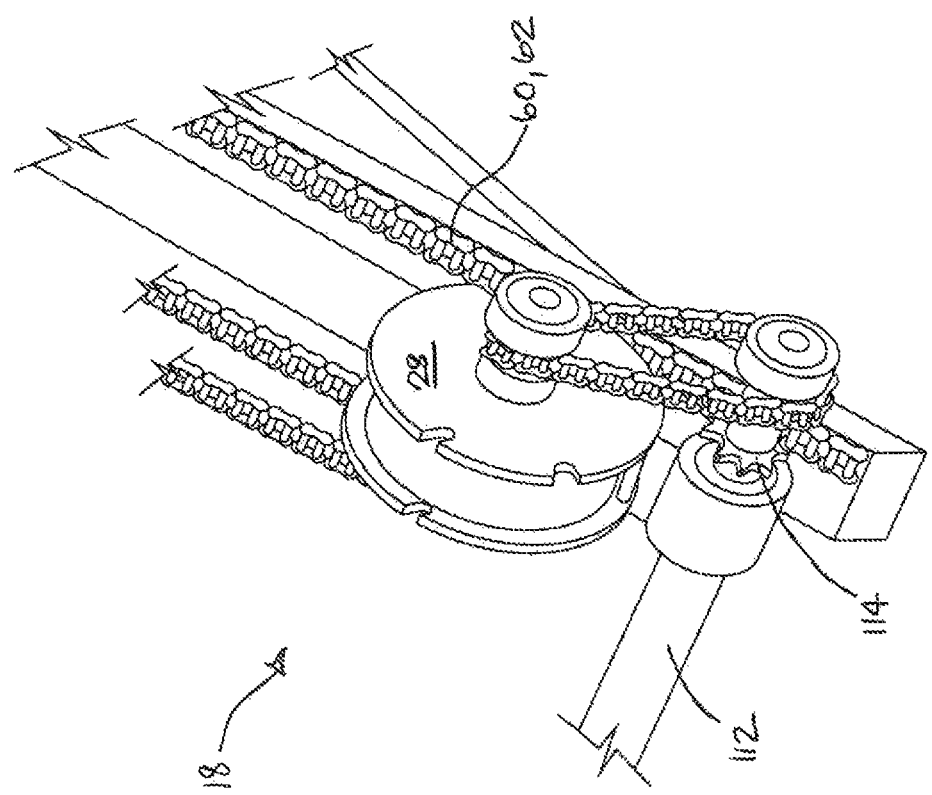
FIG. 10 is a perspective view of the drive arrangement between the clutch and the driven sprocket on a drive shaft supported on the drive frame.
Figure 11:
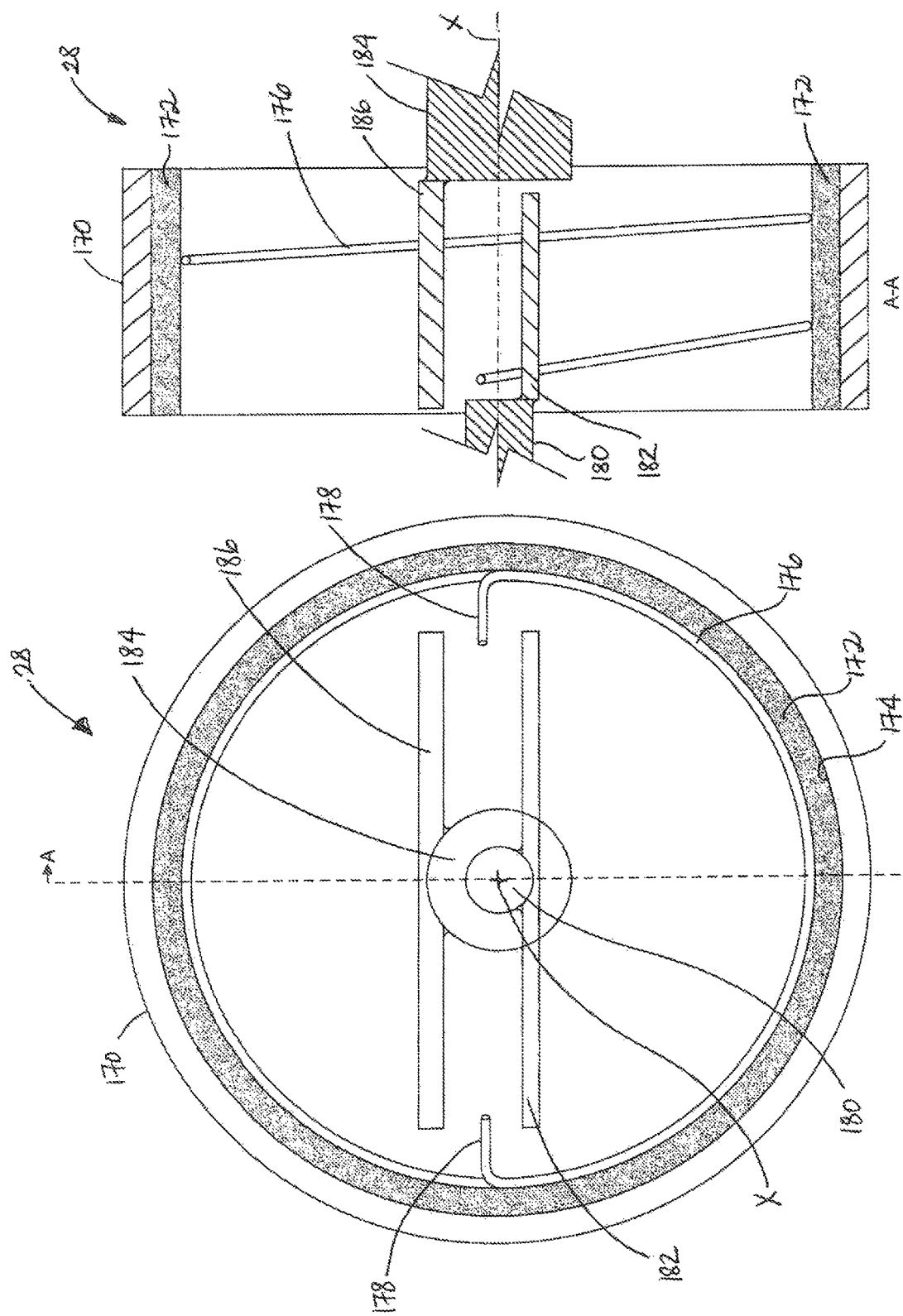
FIG. 11A is a cross-sectional view of the clutch.
FIG. 11B is a cross-sectional view of FIG. 11A along lines A-A.

Having reference to FIGS. 3, 9 and 10, the drive assembly 18, which also incorporates at least the clutch 28, is supported on the drive frame 104 and moves with the drive frame 104 and platform 16. The sprockets 114,116 on the driven shaft 112 are designed to have a diameter of about 2 inches to permit the driven shaft 112, passing below the drive frame 104 and platform 16, to be about 3 inches above the lower surface 20. The first flap 136 on the platform 16, lowered to engage the lower surface 20, forms an angled ramp to transition between the platform 16 and the lower surface 20.

Further, an optional outboard bearing 160 can be used to support the driven sprocket 114 to minimize the combined torque and bending stresses in the driven shaft 112.

In an embodiment, best seen in FIG. 9, the drive assembly 18, including the input shafts 152a,152b, associated gear reductions and the clutch 28, is mounted to a drive arm 162, supported on the drive frame 104 and pivotally connected thereto to allow about 180 degrees of rotation. The drive arm 162 is pivoted, relative to the drive frame 104, to allow the arm 162 to be folded flat to the drive frame 104 for storage and transport. Further, the arm 162 can be pivoted to a variety of positions to allow the operator or attendant comfortable access to the input shafts 152a, 152b.

In an embodiment, much like a suitcase handle, a spring lock release 164 releasably connected to the drive arm 162 is depressed, releasing the arm 162 and allowing the arm 162 to be pivoted. When the arm 162 is pivoted, the operator releases the spring lock 164 to re-engage the spring lock 164, locking the arm 162 into the desired position.

The clutch 28 ensures the drive frame 104, platform 16 and load L move only as a result of input to one or the other of the input shafts 152a,152b. In embodiments taught herein, the clutch 28 is a light, simple, load-controlling device having a high mechanical efficiency.

As shown in FIGS. 11A and 11B, the clutch 28 comprises a tubular housing 170 having an axis X and a layer of friction material 172, extending circumferentially about an inside surface 174 thereof. A clutch spring 176 is fit circumferentially inside the housing 170, overlying the friction material 172 and forced thereagainst. The clutch spring 176 comprises one or more winds of the spring material. In an embodiment, the clutch spring 176 comprises about 2.5 winds of the spring material. Opposing ends 178 of the spring 176 are bent to extend radially inwardly toward a center of the housing 170. Behaviour of the internal clutch spring 176 is similar to an external band brake and can be predicted by a natural log function.

A clutch input shaft 180 extends axially into the housing 170 at about the center thereof and is connected to a first plate 182. The clutch input shaft 180 is operatively connected to the rotary drive 150. The first plate 182 extends transversely across the housing 170 on one side of and in proximity to the opposing bent ends 178 of the spring 176.

In the embodiment shown, the first plate 182 is below the bent ends 178. A clutch driven shaft 184 extends axially into the housing 170 from an opposing side thereof. The clutch driven shaft 184 is operatively connected to the driven member 114. The clutch driven shaft 184 is connected to a second plate 186, extending transversely across the housing 170 and spaced from the first plate 182, on the opposite side of the bent ends 178 of the spring 176. Thus, the bent ends 178 of the spring 176 are located between the first and second plates 182,184. In the embodiment shown, the second plate 184 is above the bent ends 178.

When the operator rotates the drive's input shaft 152, 152b to move the platform 16 up or down along the frame 14, the clutch input shaft 180, operatively connected thereto, such as through a gear and chain drive, causes the first plate 182 to engage the bent ends 178 of the clutch spring 176 which pulls the clutch spring 176 away from the friction material 172. When the clutch spring 176 is moved away from the friction material 172, the clutch spring 176 is released and the drive's input shaft 152a,152b and clutch input shaft 180 continue to rotate and drive the clutch driven shaft 184 and drive's driven sprocket 114 and drive shaft 112, operatively connected thereto, in either direction.

Should the load L on the platform 16 act, without input from the operator, on the driven shaft 112 to try to rotate the driven shaft 112 in either direction, the clutch driven shaft 184 causes the second plate 186 to engage the bent ends 178 of the clutch spring 176 and forces the spring 176 against the friction material 172. When the clutch spring 176 is forced against the friction material 172, the clutch spring 176 cannot move and the clutch driven shaft 184 and therefore the drive's driven sprocket 114 and drive shaft 12 are locked against rotation in either direction.

In embodiments taught herein, the clutch 28 allows rotation of the drive and clutch input shafts 152,152b,180 to allow the drive and clutch driven shafts 112, 184 and driven sprocket 114 to follow it in a controlled manner such that the energy of the lowered load L is transferred to the friction material 172 wherein it is dissipated as heat.

Overspeed Braking Apparatus

Embodiments of the lift 10 are equipped with the overspeed braking apparatus 26 to ensure safe descent speeds of the drive frame 104, platform 16 and load L when returning to the lower surface 20. A variety of overspeed braking apparatus 26 can be used.

Figure 12:
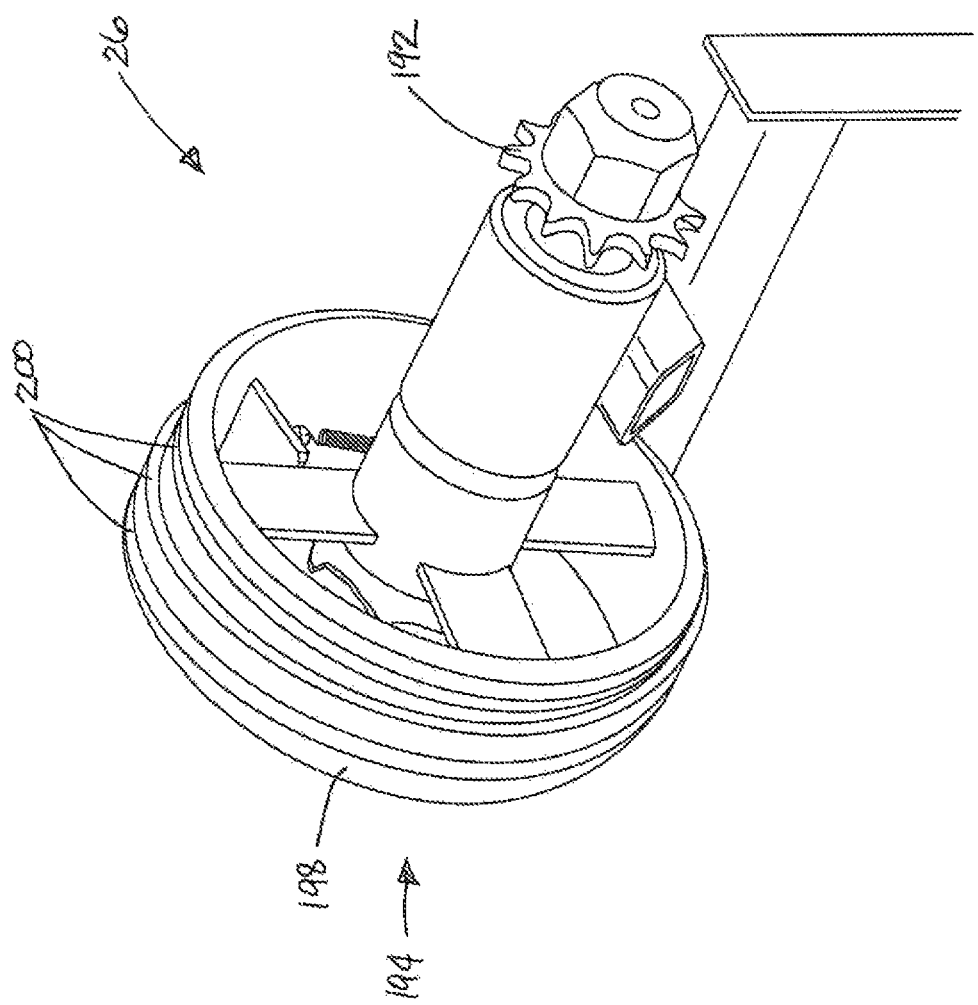
FIG. 12 is a perspective rear view of an embodiment of an overspeed braking apparatus having a shaft and sprocket for engaging the track on one of either the right or left side of the lift frame.

In embodiments, as shown in FIGS. 1 and 12, the overspeed braking apparatus 26 is supported from the drive frame 104, such as by a bracket 190 and has an overspeed sprocket 192 to engage in the rack 62 on one or other of the right or left side of the frame 14. In embodiments the overspeed braking apparatus 26 is mounted to the opposite side of the drive frame 104 from the drive arm 162.

Figure 13A:
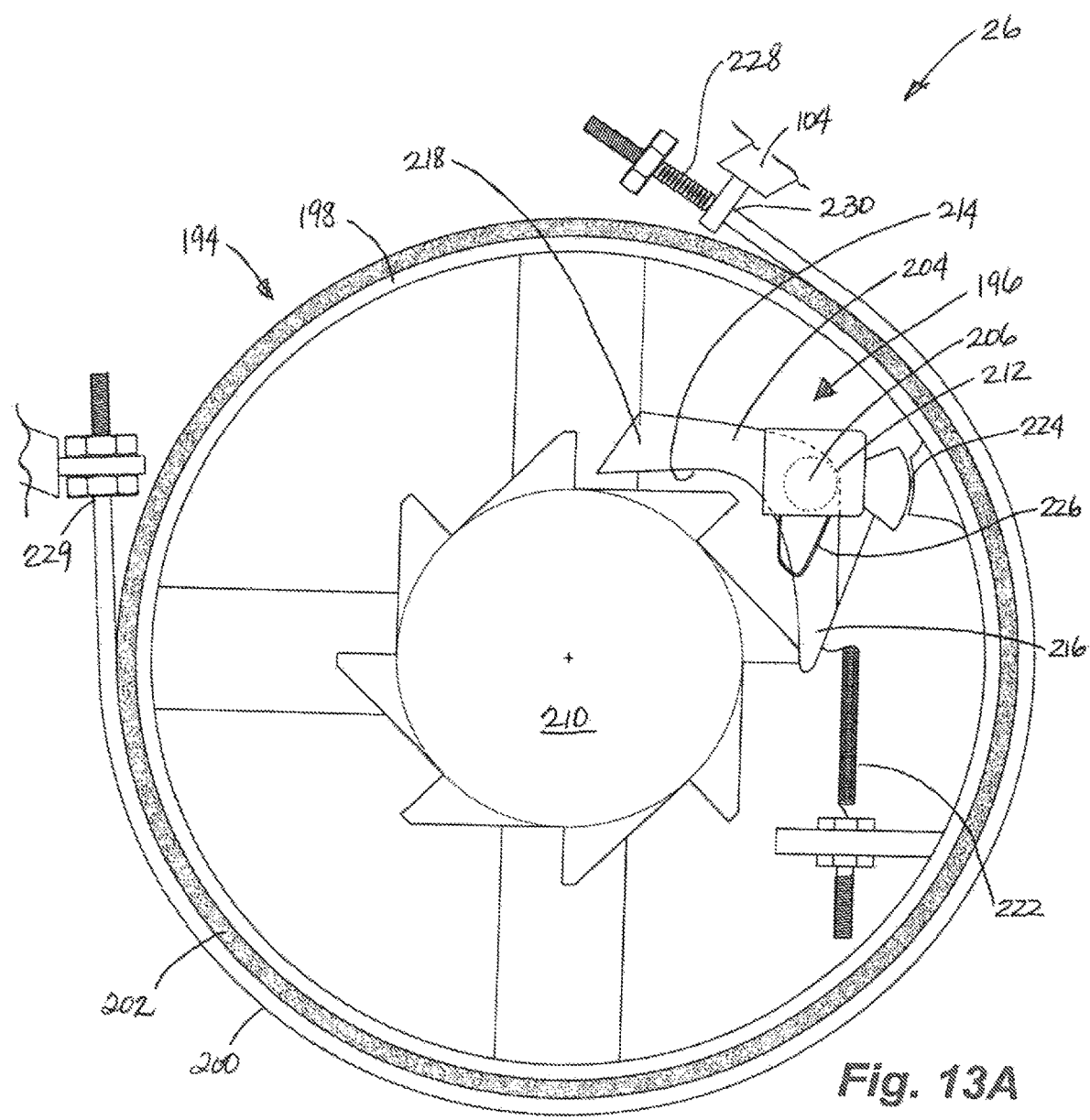
FIG. 13A is a cross-sectional view of the overspeed braking apparatus according to the embodiment of FIG. 12 and having a band brake in combination with an escapement mechanism.
Figure 13B:
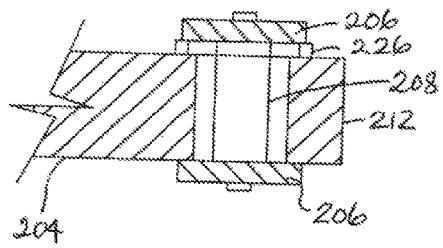
FIG. 13B is a partial cross-sectional view of an apex of a pawl rotatably supported by bearings and a bearing shaft, the bearings being spring mounted for movement toward and away from the brake drum.

Having reference to FIGS. 12, 13A and 13B, one exemplary overspeed braking apparatus 26 comprises a brake 194 operatively connected to an interference latch or escapement 196. The brake 194 can be any type of brake such as a drum brake, disk brake or band brake. The escapement 196 is reactive to latch at speeds which exceed a normal, safe, pre-set operating speed and when latched as a result, engage the brake 194 to limit the impact loading, and further to slow the load L at a controlled rate to a stop.

In embodiments taught herein, the brake 194 is a band brake. The band brake 194 comprises a circular housing or drum 198 having an axis A and one or more windings of a band 200 circumferentially about the drum 198. A friction material 202, such as a conventional brake lining, is fitted circumferentially around the brake drum 198 between the brake drum 198 and the windings of the band 200.

The escapement 196 comprises a rocking latch or pawl 204, which is pivotally supported by bearings 206 on an axially extending latch shaft 208. A toothed gear 210 is rotatably supported concentrically and coaxially within the brake drum 198 and is operatively connected, such as by the overspeed sprocket 192, to the rack 62, such that the toothed gear 210 is rotated by the movement of the drive frame 104. The pawl 204 extends radially inwardly from the latch shaft 208 toward the toothed gear 210 and is generally triangular in shape. An apex 212 of the pawl 204 is located adjacent the drum 198 and a base 214 thereof forms an engagement face. The engagement face 214, which engages the toothed gear 210, has a leading end 216 and a trailing end 218 and is curved inwardly therebetween. The pawl 204 is biased outwardly such that the leading and trailing ends 216,218 touch and follow teeth 220 on the gear 210 at the normal speed. In an embodiment, at least the trailing end 218 of the pawl 204 is biased toward the toothed gear 210 by a latch spring 222 connected between the pawl 204 and an inner surface 224 of the drum 198.

Figure 14A:
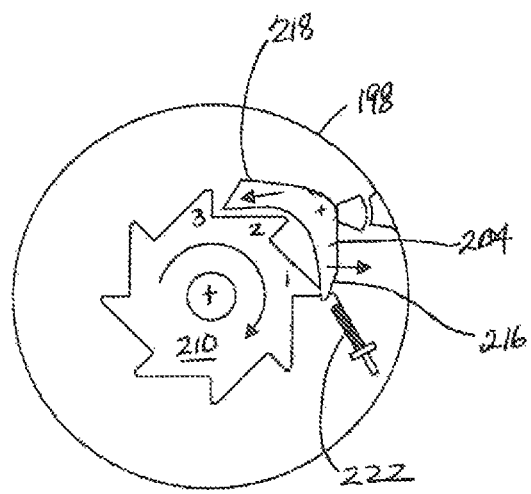
FIGS. 14A to 14C are schematics of the action of a toothed gear and a pawl in the escapement mechanism, more particularly
Figure 14B:
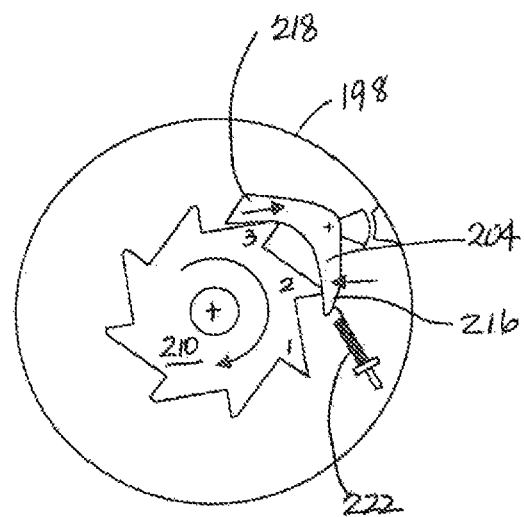

Having reference to FIGS. 14A to 14B, under safe normal operating speeds, as the toothed gear 210 is rotated with movement of the drive frame 104, the pawl 204 is reactively rocked about the latch shaft 208 by each passing tooth 220 on the gear 210, as the pawl 208 follows the teeth. When the trailing end 218 of the pawl 204 is engaged by a tooth 220, the trailing end 218 overcomes the latch spring 222 forcing the trailing end 218 to rock toward the drum 198 and away from the toothed gear 210 (FIG. 14A). The trailing end 218 follows along the tooth 220 and the tooth 220 passes thereby. At the same time, as a result of the rotation of the pawl 204, the leading end 216 of the pawl 204 is pushed inwardly toward the toothed gear 210 and into a space between adjacent teeth 220 on the gear 210. As the trailing end 218 is released from engagement with the tooth 220, the latch spring 222 biases the trailing end 218 outwardly causing the leading end 216 to rotate away from the gear 210 just as the leading end 216 approaches the next oncoming tooth 220 on the gear 210 (FIG. 14B). In this manner, the oncoming teeth 220 of the gear 210 can pass by the pawl 204 without causing the pawl 204 to latch and the gear 210 continues to rotate at the normal operating speed or below.

Figure 14C:
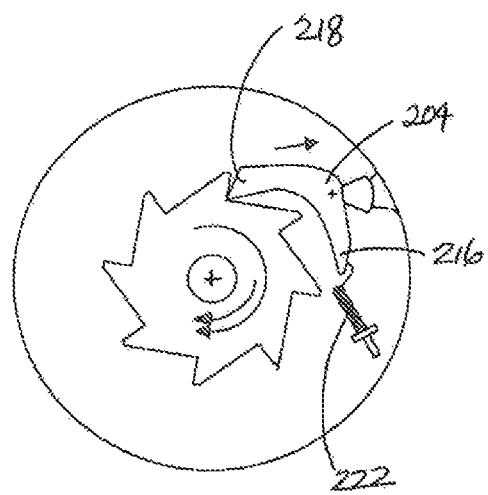

As shown in FIG. 14C, at speeds which exceed the normal, preset operating speed, the trailing end 218 of the pawl 204, which is rotated away from the gear 210, cannot be biased quickly enough to rotate the leading end 216 of the pawl 204 away from the gear 210 before it engages the next tooth 220, latching the leading end 216 of the pawl 204 therein (FIG. 14C). When latched, the brake drum 198 is caused to rotate within the brake band 200 for slowing and eventually braking the movement of the drive frame 104 and platform 16.

Opposing ends 229, 230 of the band 200 are connected to the drive frame 104. When the brake drum 198 is caused to rotate within the brake band 200, tension is applied at a tension end 230 of the brake band. This causes the brake band 200 to tighten about the brake drum, slowing, and ultimately stopping, rotation of the brake drum 198, toothed gear 210 and the overspeed sprocket 192 engaged in the rack 62. Thus, movement of the drive frame 104 and platform 16 is also slowed and ultimately stopped.

A shown in FIG. 13A, brake band spring 228 is connected to the tension end 230 of the band 220. As tension is applied, the spring 228 compresses. Adjustment of the spring 228 sets an appropriate braking torque.

A conventional escapement 196 having bearings 206 and latch shaft 208 capable of accepting the load when the pawl 204 is latched could be used. Such bearings 206 however are necessarily large and heavy to carry the high loads when the pawl 204 engages. The larger the bearing 206, the more it is affected by corrosion, dirt, or temperature, which then affects the speed at which the pawl 204 engages and therefore the precision of the load control.

In embodiments taught herein, a very light, small bearing 206 is used to provide much more precise and accurate speed control. The bearings 206 are spring mounted 226 such that the bearings 206 do not need to take the load induced when the pawl 204 engages, while still allowing the pawl 204 to move relatively freely under the influence of the toothed gear 210 and the latch spring 222. Thus, the escapement 196 is relatively more sensitive than conventional mechanisms. The increase in sensitivity is related to the difference in the size and weight of the bearing 206 selected relative to the conventional bearing.

When the escapement 196 is latched in the toothed gear 210 at overspeed, the spring mount 226 permits the bearing 206 and shaft 208, to displace or kick back toward the drum 198 (FIG. 14C). When displaced, the escapement 196 engages the inside 224 of the drum 198 thereby transferring the load directly to the drum 198 rather than through the bearing 206. Thus, the overspeed braking apparatus 26 is capable of high loading with a degree of increased accuracy that varies but is generally several times more accurate.

Advantageously, the smaller than conventional bearing 206 and shaft 208 are much less sensitive to temperature changes, to dirt and to moisture than are the larger bearing and shaft in a heavier conventional escapement apparatus. Further, the reduction in weight is advantageous for reducing the overall weight of the portable lift 10.

As one of skill will appreciate, the braking torque on the drum 198 of the overspeed braking apparatus 26 is almost independent of friction between the band 200 and the drum 198.

Brake torque is calculated as follows:

$$T_1 = T_2 e^{\mu\Theta} \text{ where:}$$

$T_1$ and $T_2$ are the tensions at the ends of the brake band;
e is the natural log base 2.718;
μ is the friction factor between the band and the drum; and
Θ is the wrap angle of contact between the drum and the brake band.

$$T_1 - T_2 = \text{brake torque}$$

As the number of windings of the band 200 is increased, the brake 194 becomes dependent largely only on the setting of the spring 228 connected to the tension end 230 of the band 200. Where the band 200 is wrapped three or more times about the drum 198, the $T_2$ drops to almost zero, regardless of the friction factor. Embodiments thereby minimize or eliminate the adverse effects of friction on impact loading and deceleration, which may result from corrosion, moisture, temperature or lubrication, in conventional disc or simple band brakes.

Thus, the overspeed braking apparatus 26 is capable of both high sensitivity and high load, whereas prior art systems are typically one or the other. Unlike conventional apparatus, the embodiments of the overspeed braking apparatus 26 are also very stable, even in the presence of corrosion, temperature, moisture or any other changes in the friction factor between the band 200 and the brake drum 198.

Applicant believes that embodiments of the overspeed braking apparatus 26 taught herein may be useful in a variety of apparatus, not limited to the current portable lift apparatus. The high sensitivity and high load capabilities would be advantageous if applied to controlling speeds of other moving loads, such as in conventional fall arrest apparatus and the like.

Embodiments of the portable lift 10 can be attendant-operated or can be operated by a passenger transported on the platform 16. Where the lift 10 is assembled over stairs and the stairs are sufficiently wide, the attendant can operate rotary input 150, while walking up or down the stairs beside the platform 16.

Having reference again to FIG. 9, where the stairs are too narrow to permit the attendant to walk beside the platform 16, an articulated extension member 240 can be used to connect between the input shaft 152a,152b and the rotary drive 150 and the attendant can walk up the stairs in front of the platform 16, such as between the sides of the frame 14. Alternatively, and also where there are no stairs, the attendant can use the articulated extension member 240 to drive the lift 10 while standing on either the lower or elevated surface 20,22.

In a further embodiment, where the motor is wired or wirelessly operable and is connected to the input shaft 152b, the attendant can control operation of the motor from either the lower surface 20 or the elevated surface 22 using a motor controller.

In yet another embodiment, shown in dotted lines in FIG. 9, the input shafts 152a,152b extend toward the platform 16 or are extended through the drive assembly 18 and drive arm 162 for connection to the rotary input 150 from either the platform 16 or outside the platform 16. In this way, either a person on the platform 16 can operate the lift 10 from the platform 16 or a person away from the platform 16 can operate the lift 10.

Transport or Storage

Figure 15:
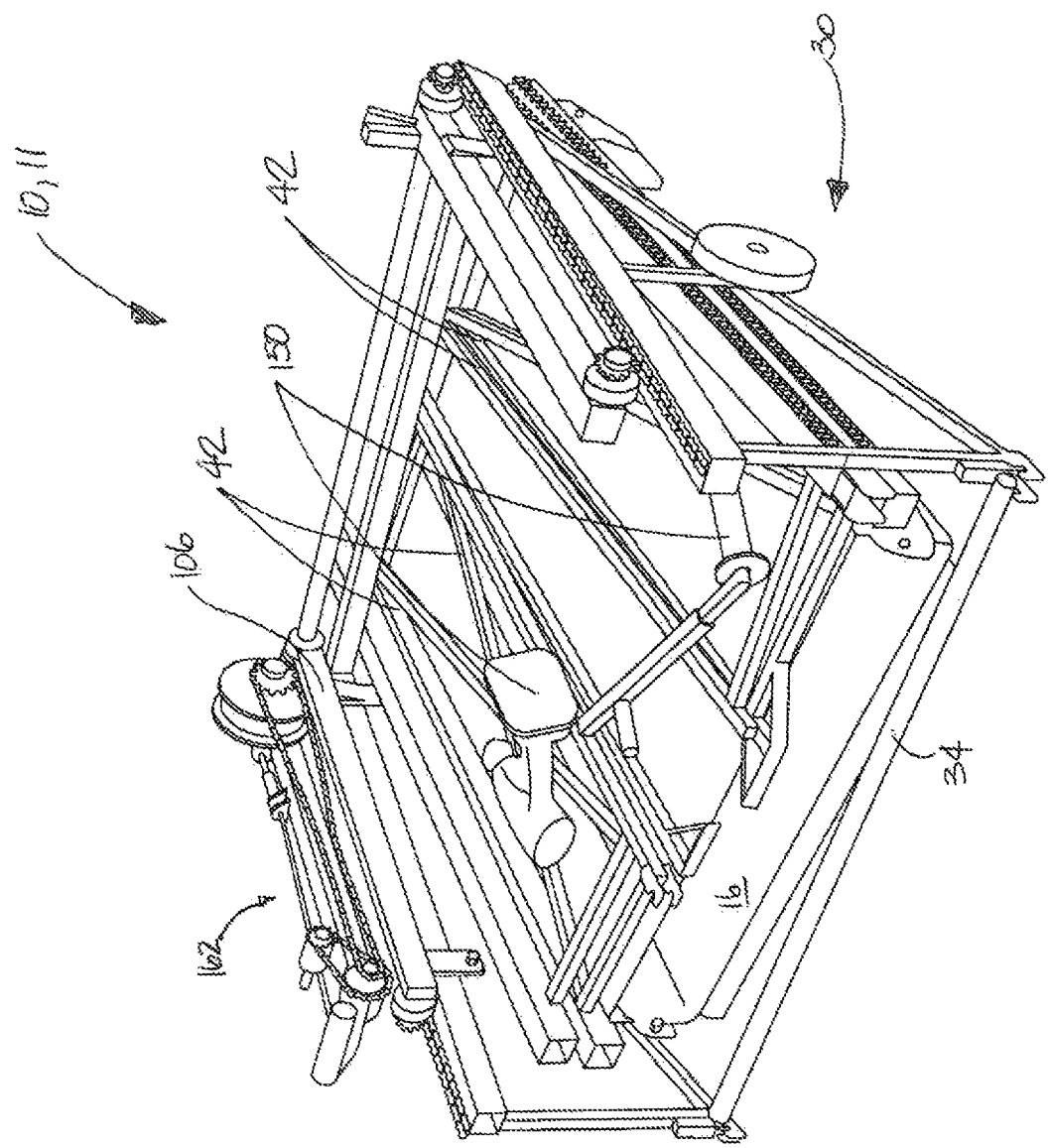
FIG. 15 is an exploded view of a knocked down lift, transportable and storable as a unit.

Embodiments taught herein provide a compact portable and transportable lift 10. When knocked down as shown in FIG. 15, the components are nested or arranged to provide the wheeled unit 11 that can be readily stored or moved to a desired location and assembled on site, as described above. Transport wheels 13, connected to the lower flanges 36 on each side of the base 30 can be used as dolly wheels for ease of movement of the wheeled unit 11 to a site.

In greater detail, in the knocked down transport mode, as shown in FIG. 15, the lower triangular base 30, to which the drive frame 104 remains connected by the sprockets 114, 116 and under-idlers 122, supports the remainder of the components of the lift 10 for transport as the wheeled unit 11. The rotary drive 150 is disconnected from the input shaft 152a,152b. The level adjusters 126 are disconnected from the platform 16 and the platform 16 is lifted from the drive frame 104. The one or more pairs of rectangular trusses 42 are disconnected from the base 30 by releasing the spring pins 76 at the upper flanges 36, pulling the male pins 72 out of the female sockets 80. Thereafter the trusses 42 are lifted to lift the engagement members 82 from the hooks 88 at the lower flanges 38 thereby lifting the lugs 86 out of the recesses 92 therein.

Thereafter, the flaps 136,138 on the platform are folded onto the platform 16 to form a compact unit.

While there are a number of different ways in which the components can be stored in the base 30, in an embodiment, the platform 16 is placed into the base 30 to rest on the span members 34. The two or more pairs of right and left upper rectangular trusses 42 are stacked onto the platform 16, as are the level adjusters 126 and the rotary drive 150.

The drive arm 162 is pivoted downward to lay flat and overlay the parallel drive frame member 106 to which it is connected, during transport and/or storage. However, during transport, the drive arm 162 can be raised to act as a dolly arm for rolling the wheeled unit 242 to the storage location. Alternatively, a large L-shaped handle can be connected to a span member 34 on the base 30 to be used to push the wheeled unit 242.

In an alternate embodiment, prior to positioning the platform 16 in the base 30, the rectangular trusses 42 are stacked therein and the platform 16 is then laid thereon. Thereafter, the remaining components are laid on the platform 16 for transport and storage as described above.

As one of skill will appreciate, components of the lift 10 could be connected using other types of folding or pivoting connections, which would allow the components to be knocked down to form the wheeled unit 242, without departing from the overall concepts disclosed herein.

Embodiments in which an exclusive property or privilege is claimed are defined as follows:

1. An overspeed braking apparatus for use in slowing and ultimately stopping a moving load exceeding a pre-set operating speed, comprising:
    a band brake comprising:
        a circular brake drum having an axis;
        one or more windings of a band wound circumferentially about the brake drum, opposing ends thereof being connected to the moving load; and
    an escapement operatively arranged intermediate the moving load and the band brake for latching at speeds exceeding the pre-set operating speed and engaging the band brake to limit impact loading and to slow the moving load to a controlled stop, wherein the escapement comprises:
        a toothed gear rotatably supported concentrically and coaxially within the brake drum and operatively connected to the moving load for rotation with movement thereof;
        a rocking pawl pivotally supported in the brake drum, the pawl engaging teeth on the toothed gear; and
        biasing means for biasing the pawl into engagement with the toothed gear, wherein at or below the pre-set operating speed, the pawl rocks reactively as the teeth on the gear engage the pawl, the biasing means acting to move the pawl toward the brake drum for preventing the pawl from latching to the gear; and
        wherein at the speeds exceeding the pre-set operating speed, the biasing means cannot bias the pawl quickly enough to move the pawl away from the teeth and the pawl latches thereto, causing the toothed gear to rotate with the brake drum and apply tension to the band for slowing and stopping movement of the moving load.

2. The overspeed braking apparatus of claim 1, wherein the band brake further comprises friction material between the brake drum and the band.

3. The overspeed braking apparatus of claim 1 wherein the escapement further comprises:
    bearings and a bearing shaft for pivotally connecting the rocking pawl to the brake drum.

4. The overspeed braking apparatus of claim 3 wherein the bearings are spring mounted for displacing the bearings and bearing shaft into engagement with the brake drum for transferring load to the brake drum when the pawl is latched.

5. The overspeed braking apparatus of claim 4 wherein the bearings and shaft are lighter in weight and smaller than conventional bearings and shaft.

6. The overspeed braking apparatus of claim 1 wherein the band is wound 2 to 3 times around the brake drum.

7. The overspeed braking apparatus of claim 1 wherein the band is wound greater than 3 times around the brake drum.

* * * * *